(12) United States Patent
Shinohara

(10) Patent No.: US 8,045,274 B2
(45) Date of Patent: Oct. 25, 2011

(54) ZOOM LENS AND IMAGE PICKUP APPARATUS USING THE SAME

(75) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/556,026

(22) Filed: Sep. 9, 2009

(65) Prior Publication Data

US 2010/0103531 A1    Apr. 29, 2010

(30) Foreign Application Priority Data

Oct. 23, 2008   (JP) .................................. 2008-272918

(51) Int. Cl.
*G02B 15/14* (2006.01)
(52) U.S. Cl. ........ 359/680; 359/682; 359/683; 359/684; 359/685; 359/689; 359/716; 359/740; 359/781; 359/783; 359/784
(58) Field of Classification Search .......... 359/682–685, 359/680, 689, 716, 740, 781, 783, 784
See application file for complete search history.

(56) References Cited

U.S. PATENT DOCUMENTS

| | | |
|---|---|---|
| 7,289,275 B2 | 10/2007 | Ito |
| 7,333,275 B2 | 2/2008 | Sekita |
| 2004/0156121 A1 * | 8/2004 | Ori et al. ...................... 359/689 |
| 2004/0223231 A1 * | 11/2004 | Sekita ........................... 359/680 |
| 2006/0176575 A1 * | 8/2006 | Katakura ...................... 359/680 |
| 2006/0215275 A1 * | 9/2006 | Ori ............................... 359/680 |
| 2006/0250700 A1 * | 11/2006 | Sekita ........................... 359/680 |
| 2007/0121218 A1 * | 5/2007 | Yamaguchi et al. ......... 359/680 |
| 2008/0043341 A1 | 2/2008 | Ori |

FOREIGN PATENT DOCUMENTS

| | | |
|---|---|---|
| CN | 1700050 A | 11/2005 |
| JP | 2003-1311132 A | 5/2003 |
| JP | 2004-061675 A | 2/2004 |
| JP | 4007789 B2 | 11/2007 |

* cited by examiner

Primary Examiner — Evelyn A. Lester

(74) Attorney, Agent, or Firm — Canon USA Inc IP Division

(57) ABSTRACT

A zoom lens includes a first lens unit with a negative refractive power, a second lens unit with a positive refractive power, and a third lens unit with a positive refractive power in order from the object side to the image side. The first lens unit includes a negative lens and a positive lens. When the curvature radius of the object side surface and that of the image side surface of the negative lens are respectively defined as R11 and R12 and the curvature radius of the object side surface and that of the image side surface of the positive lens are respectively defined as R21 and R22, the following conditional expression is satisfied: $-5.6 < (R12+R21)/(R12-R21) < -4.7$ and $1.5 < (R11+R22)/(R11-R22) < 2.3$.

8 Claims, 21 Drawing Sheets

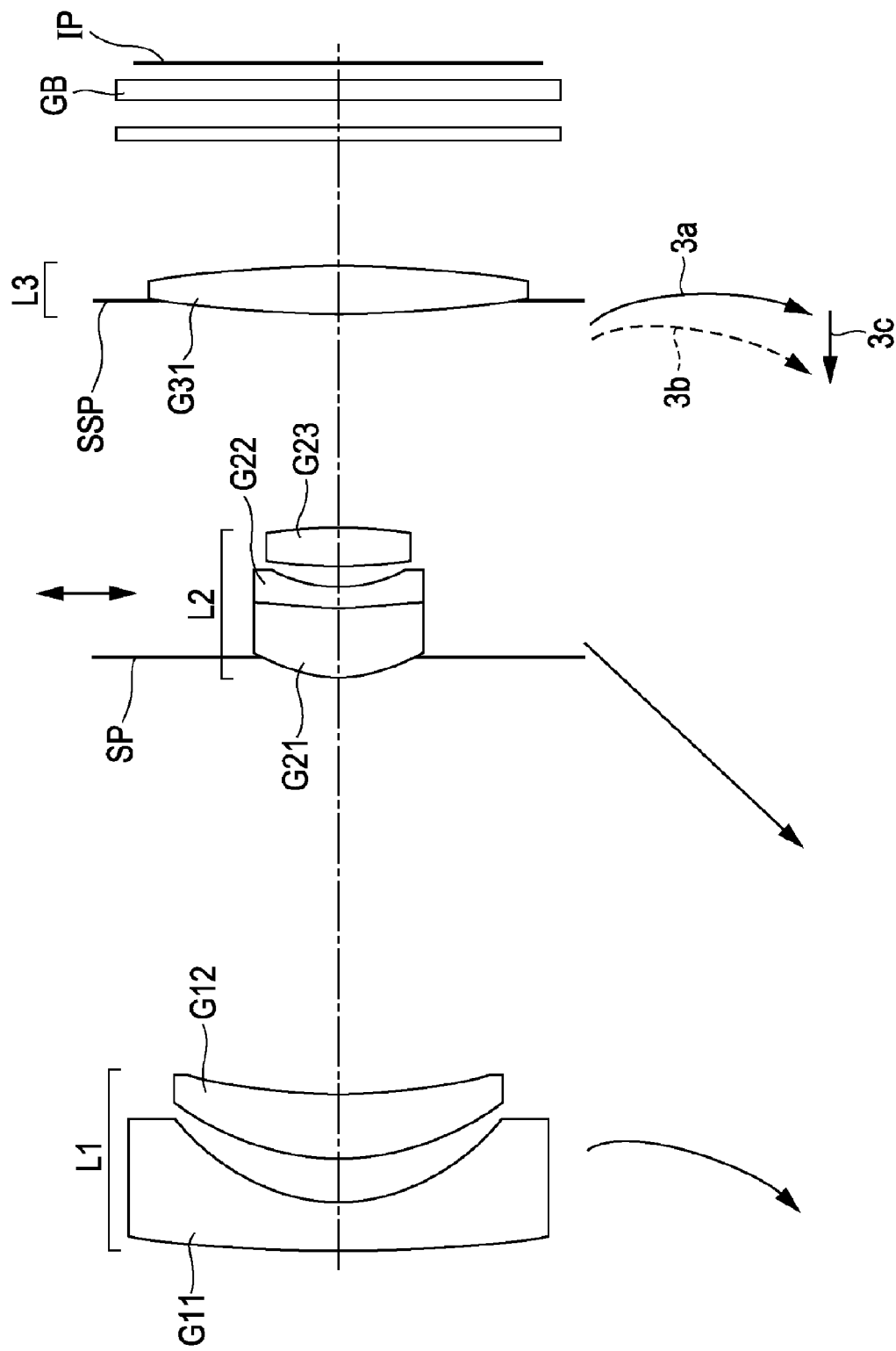

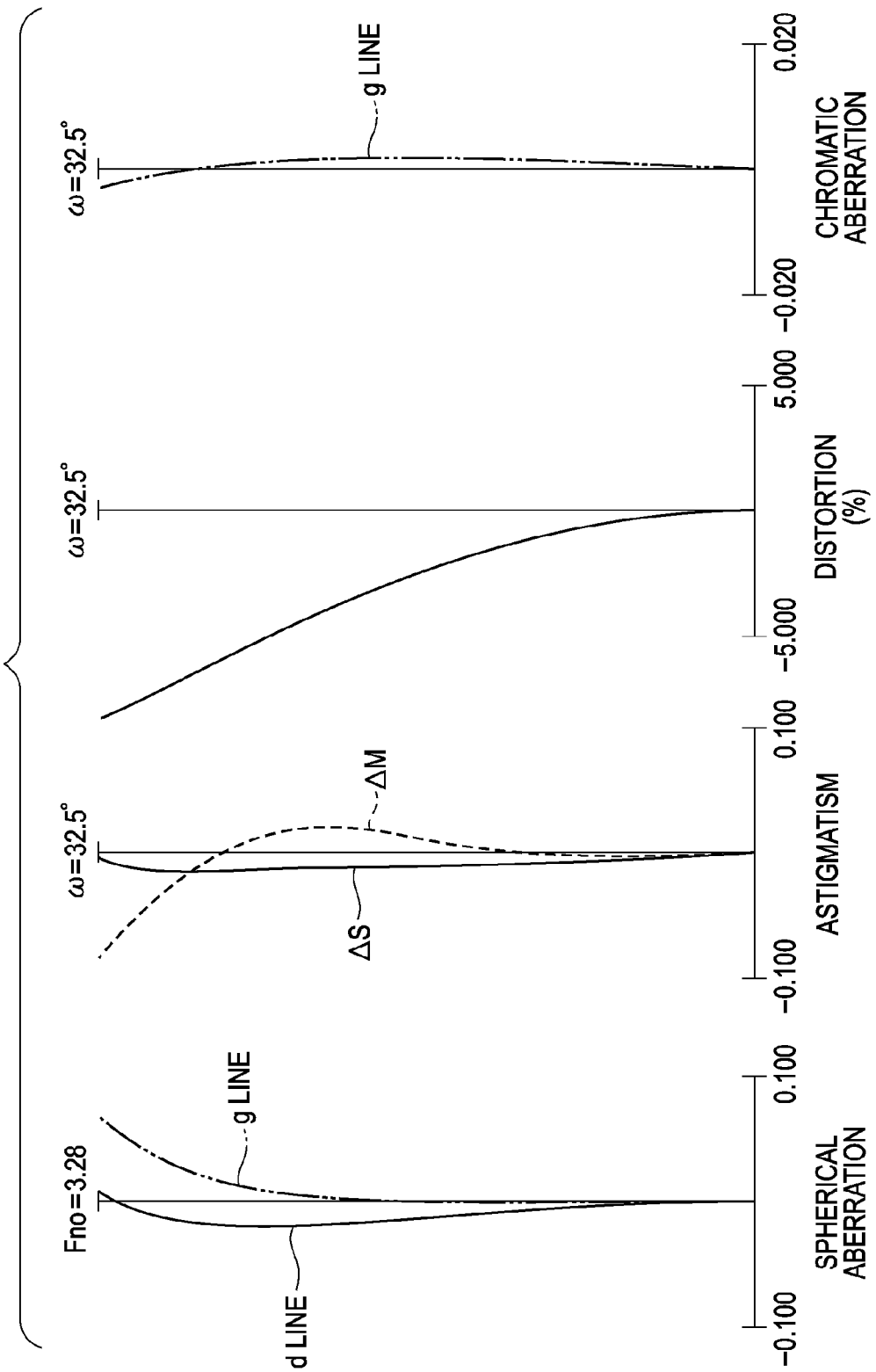

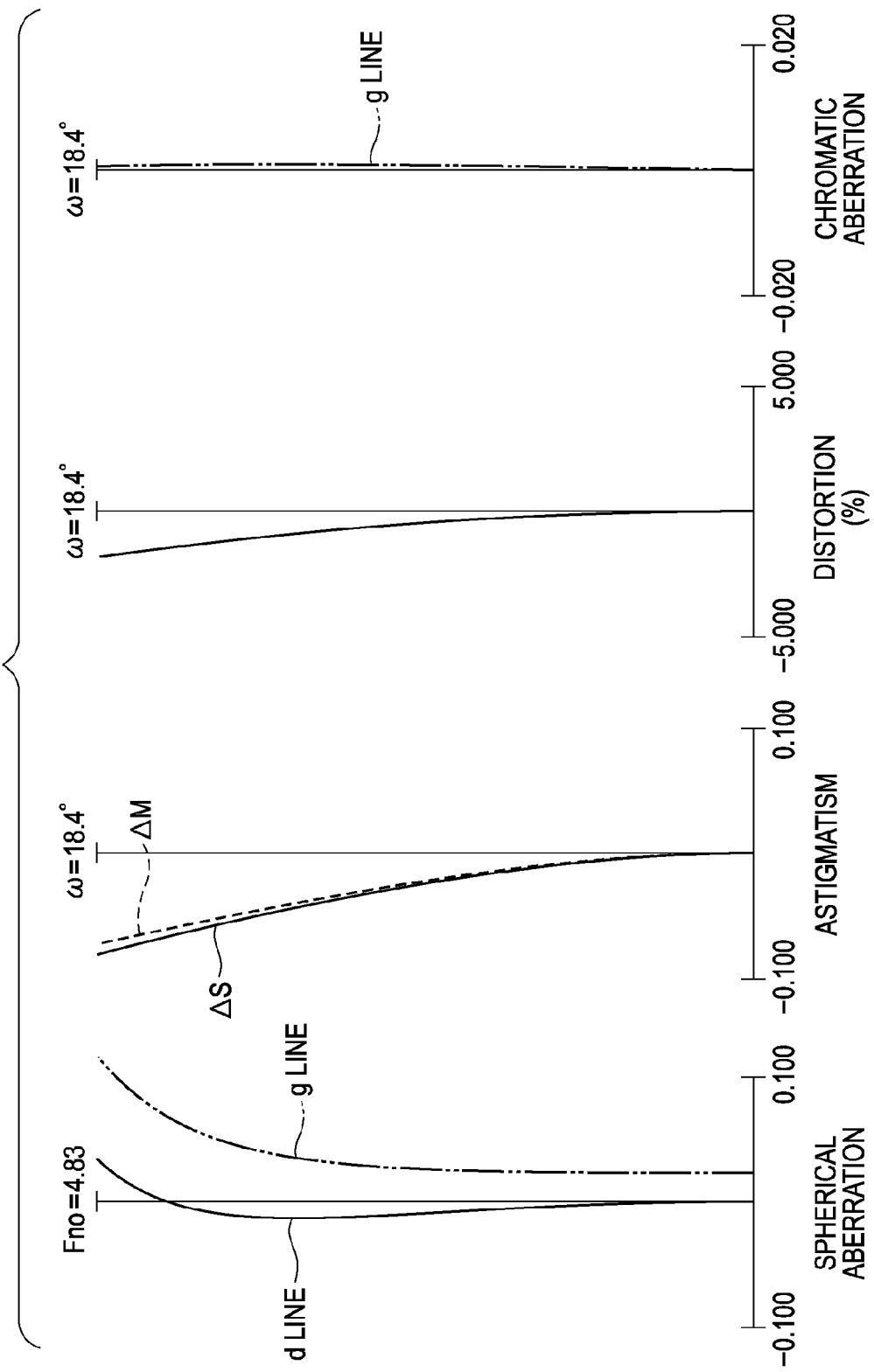

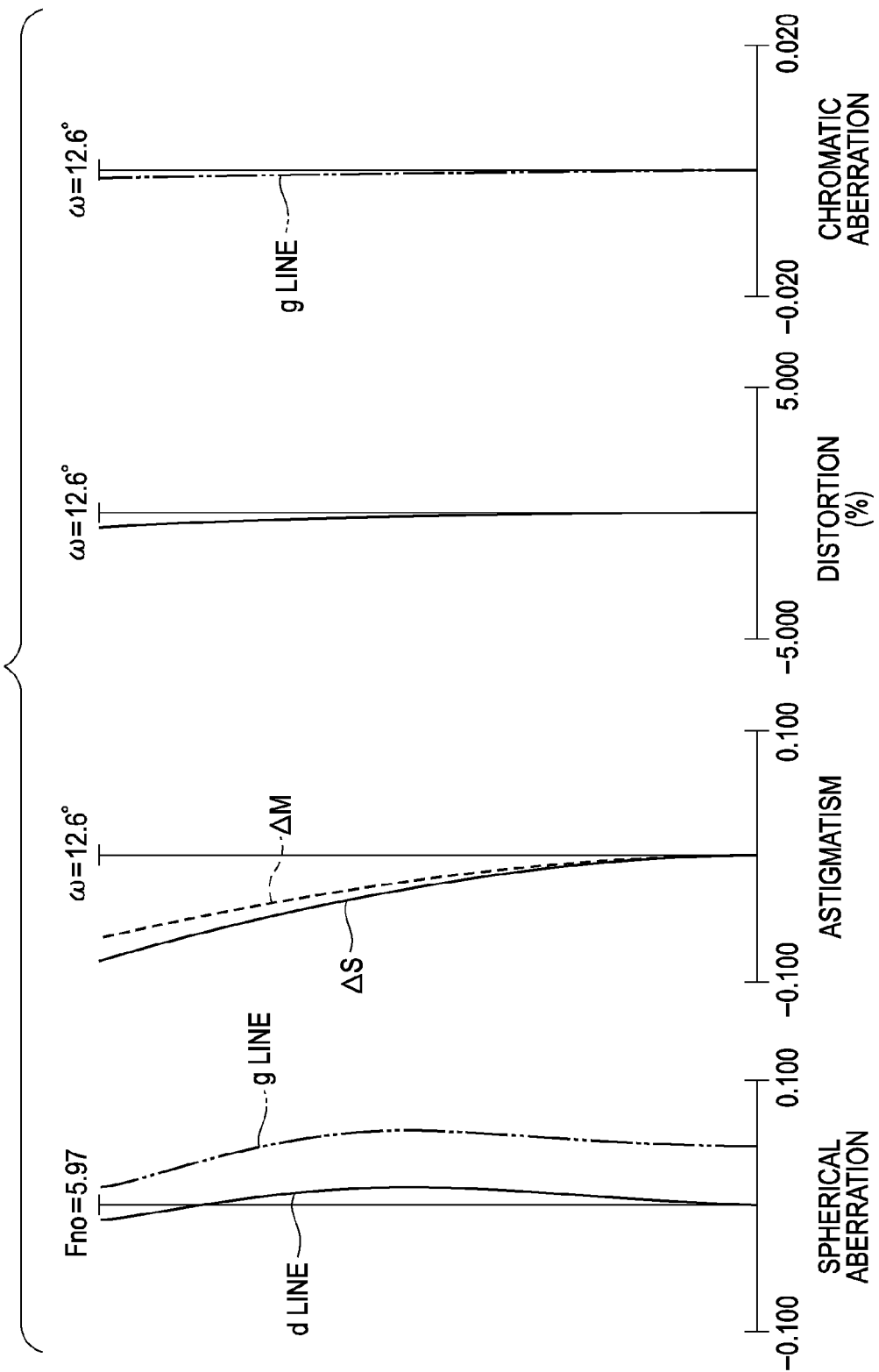

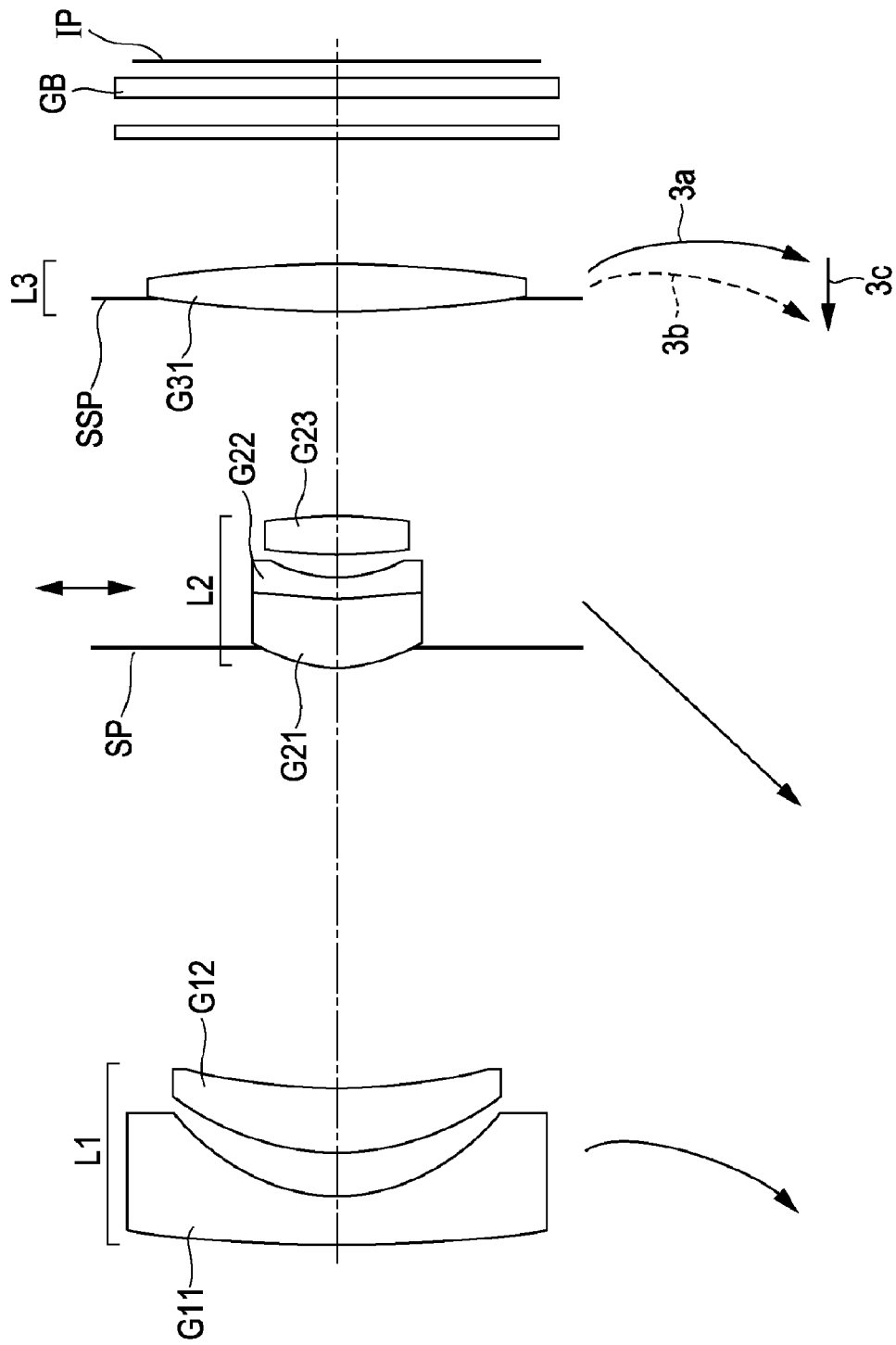

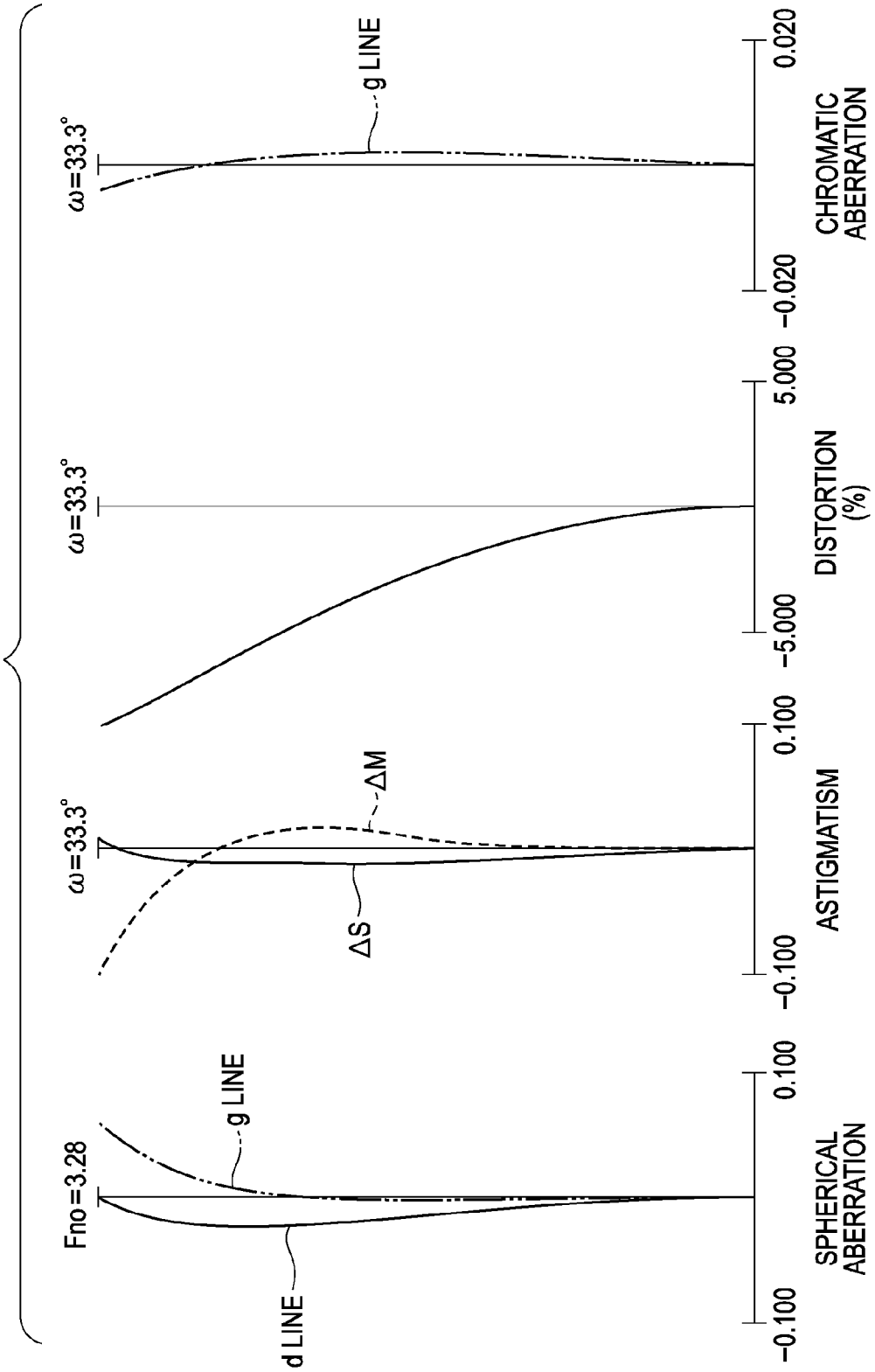

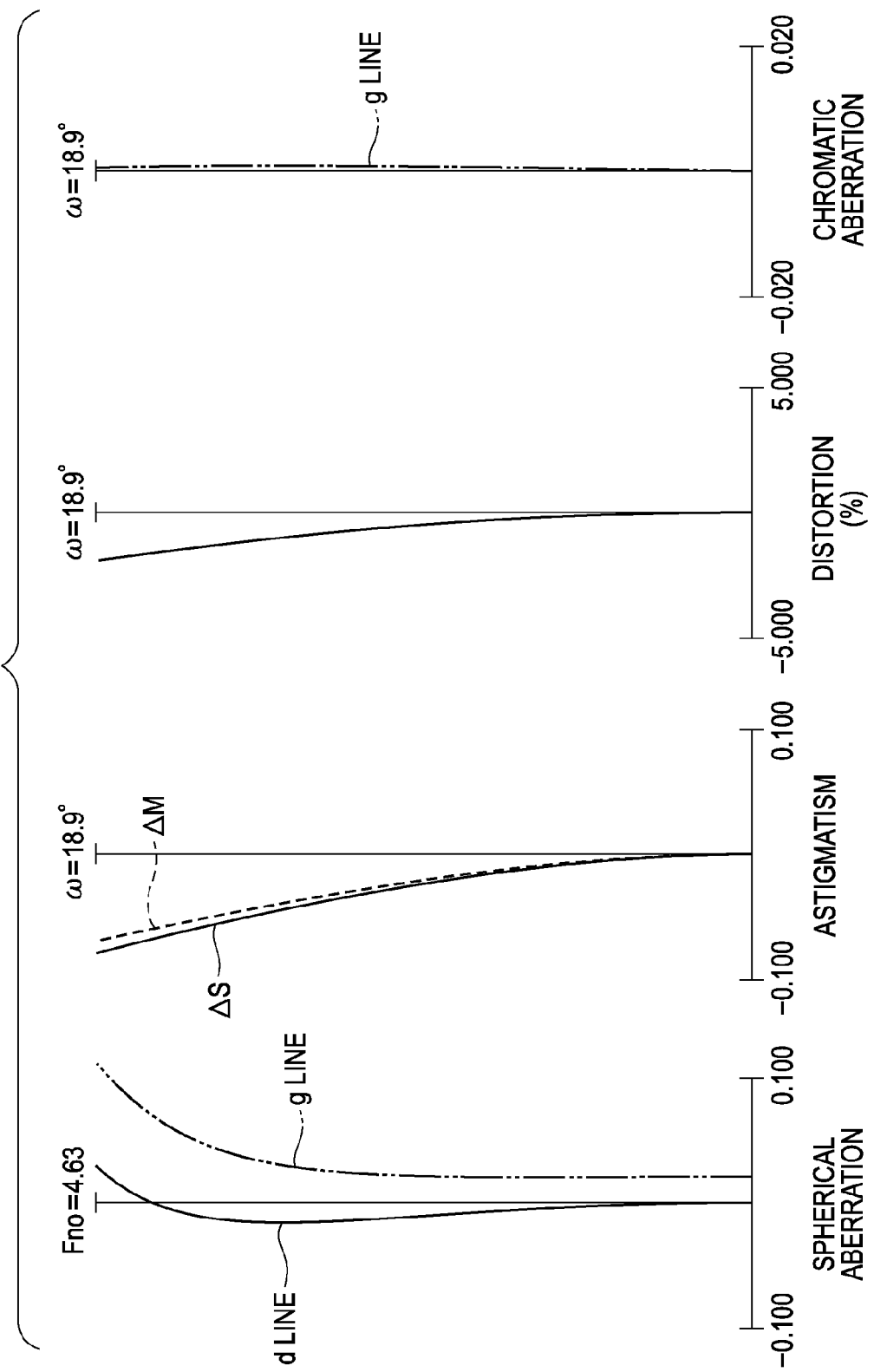

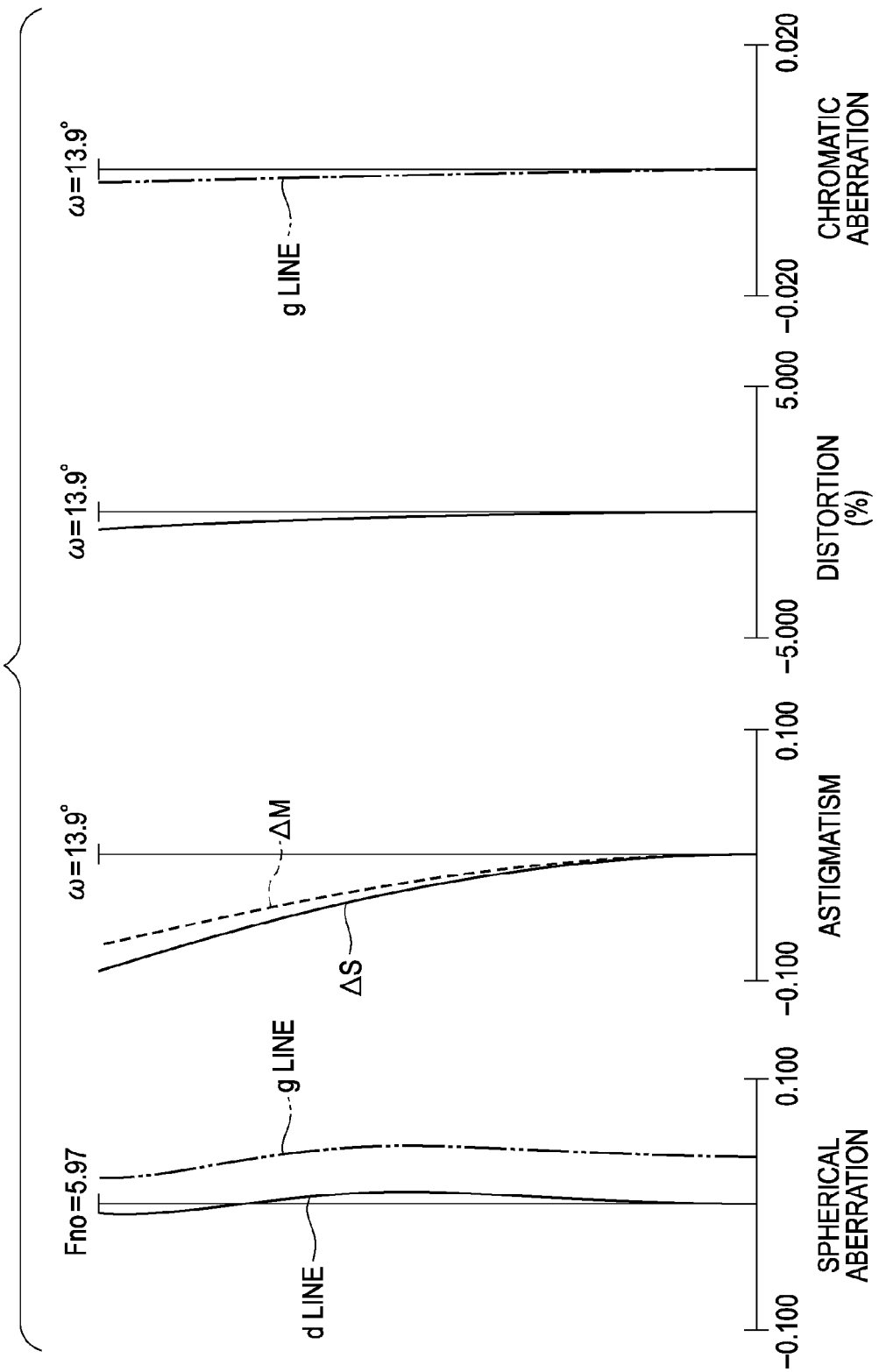

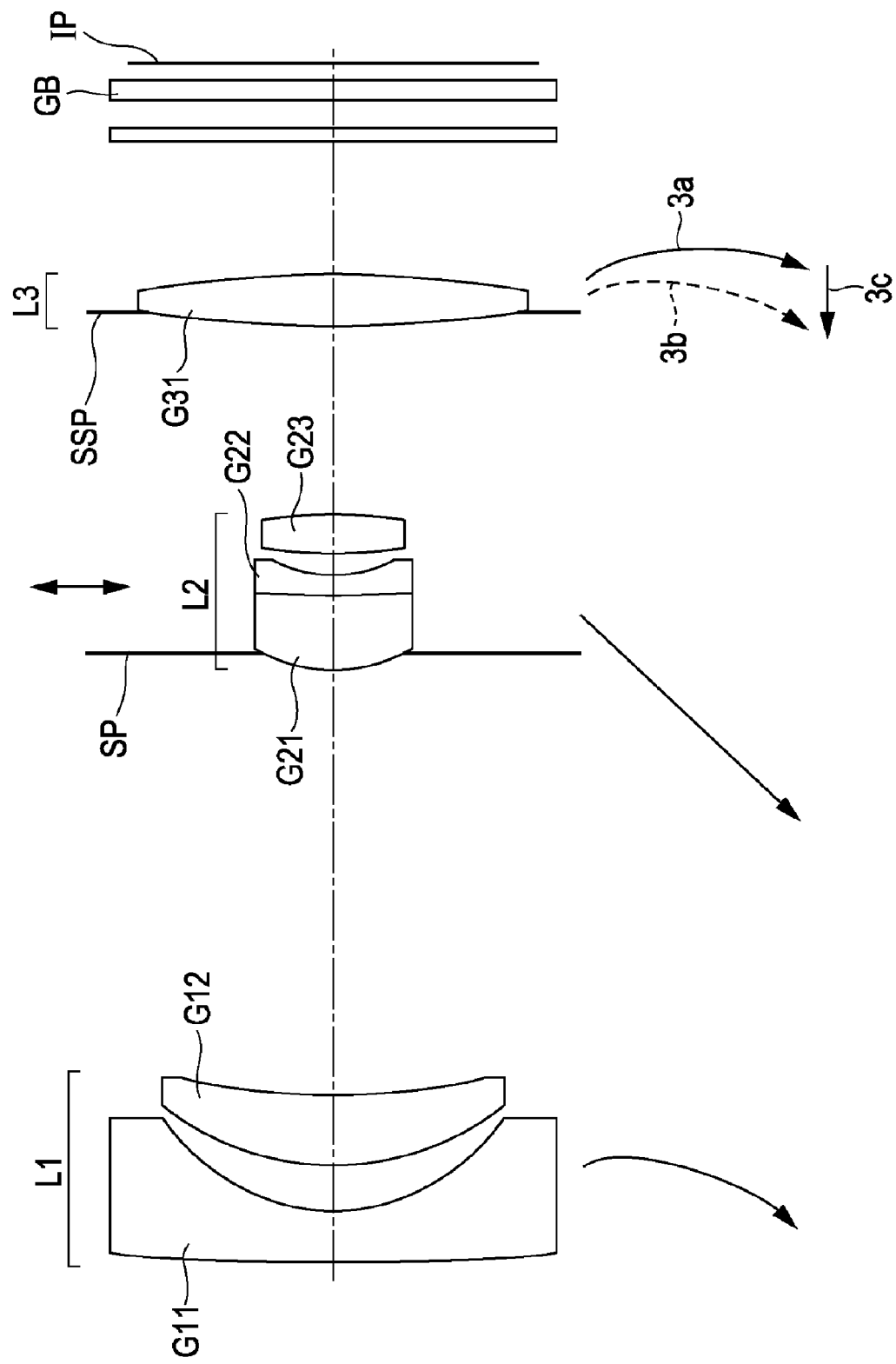

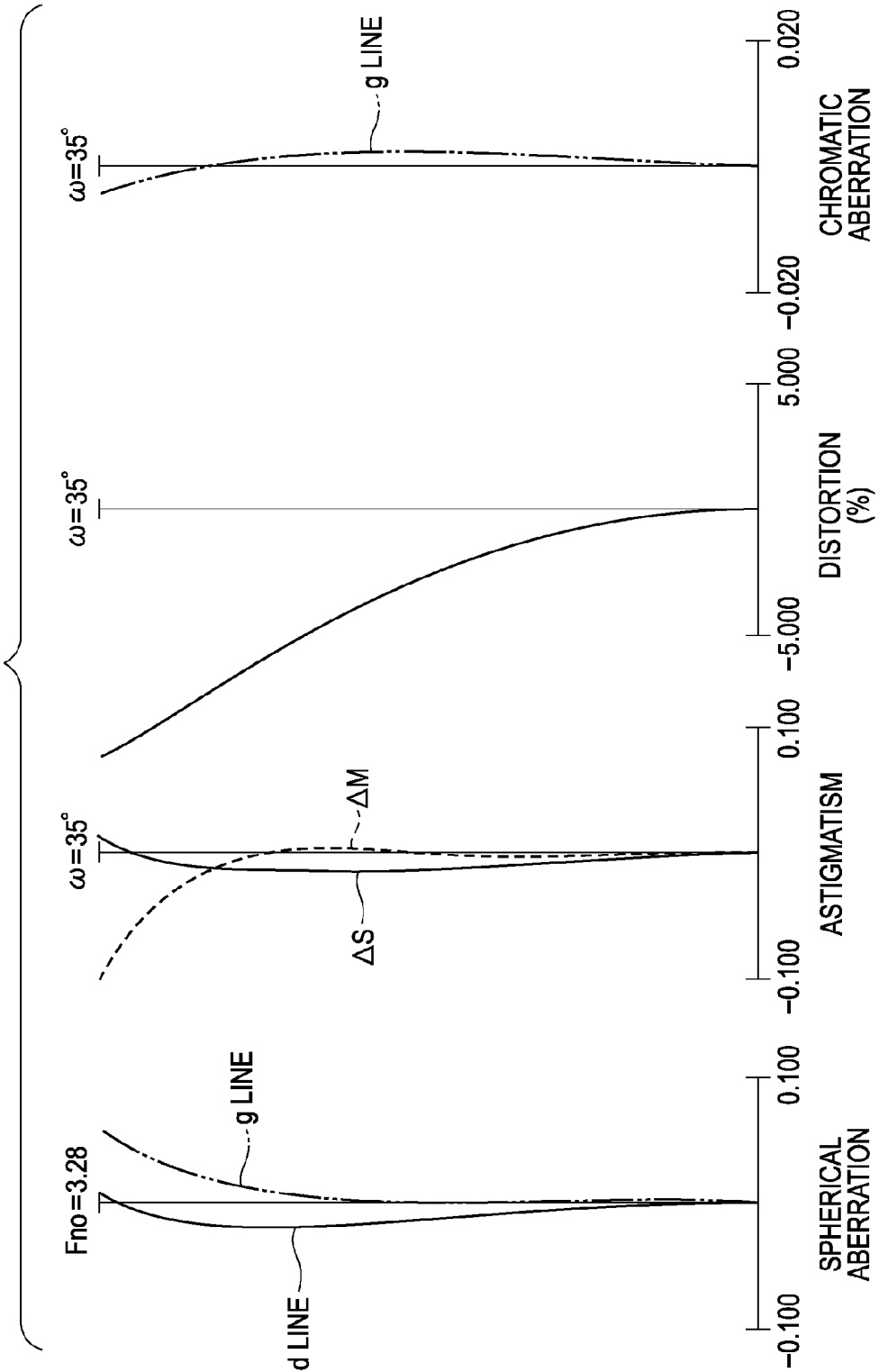

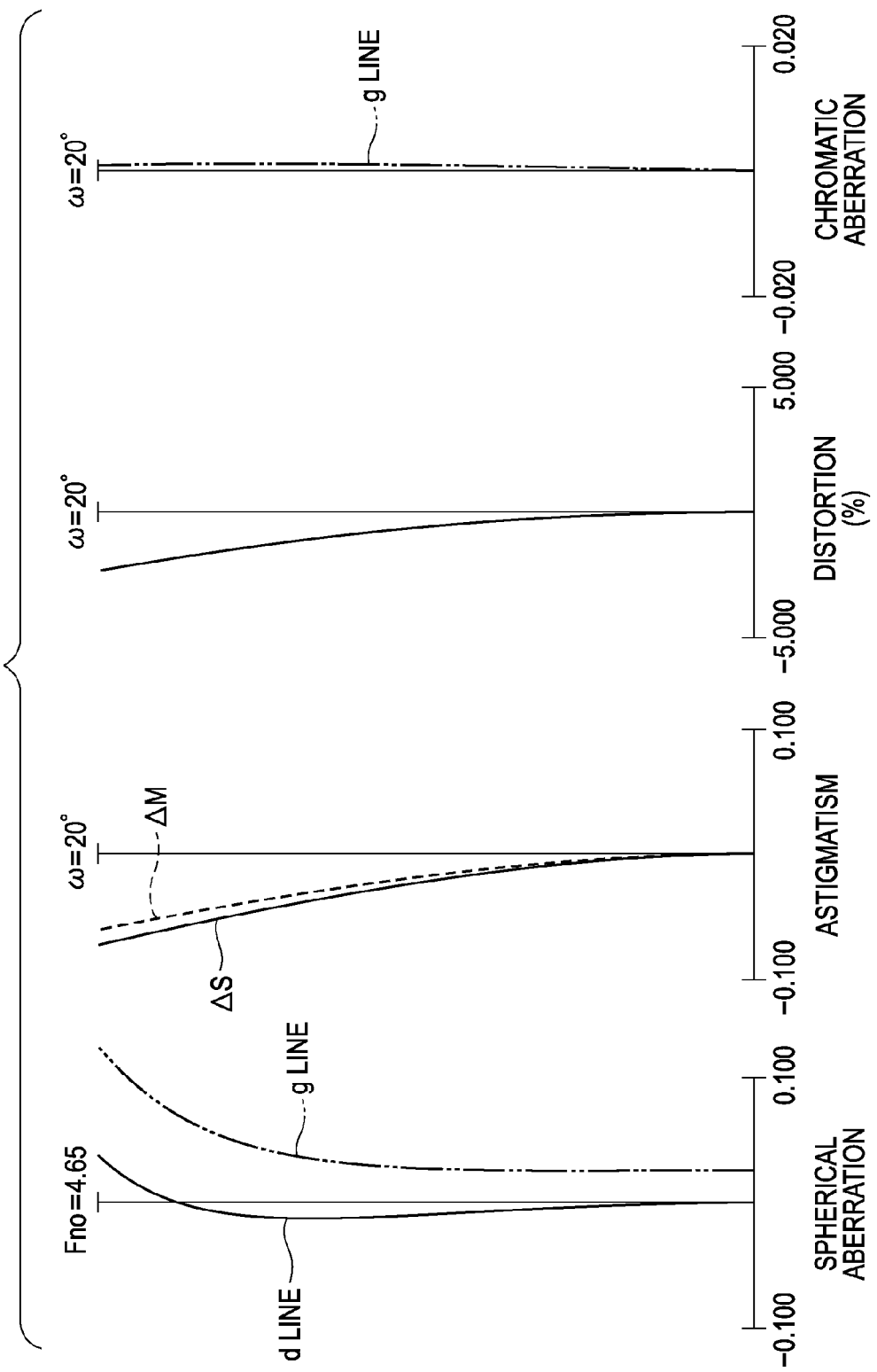

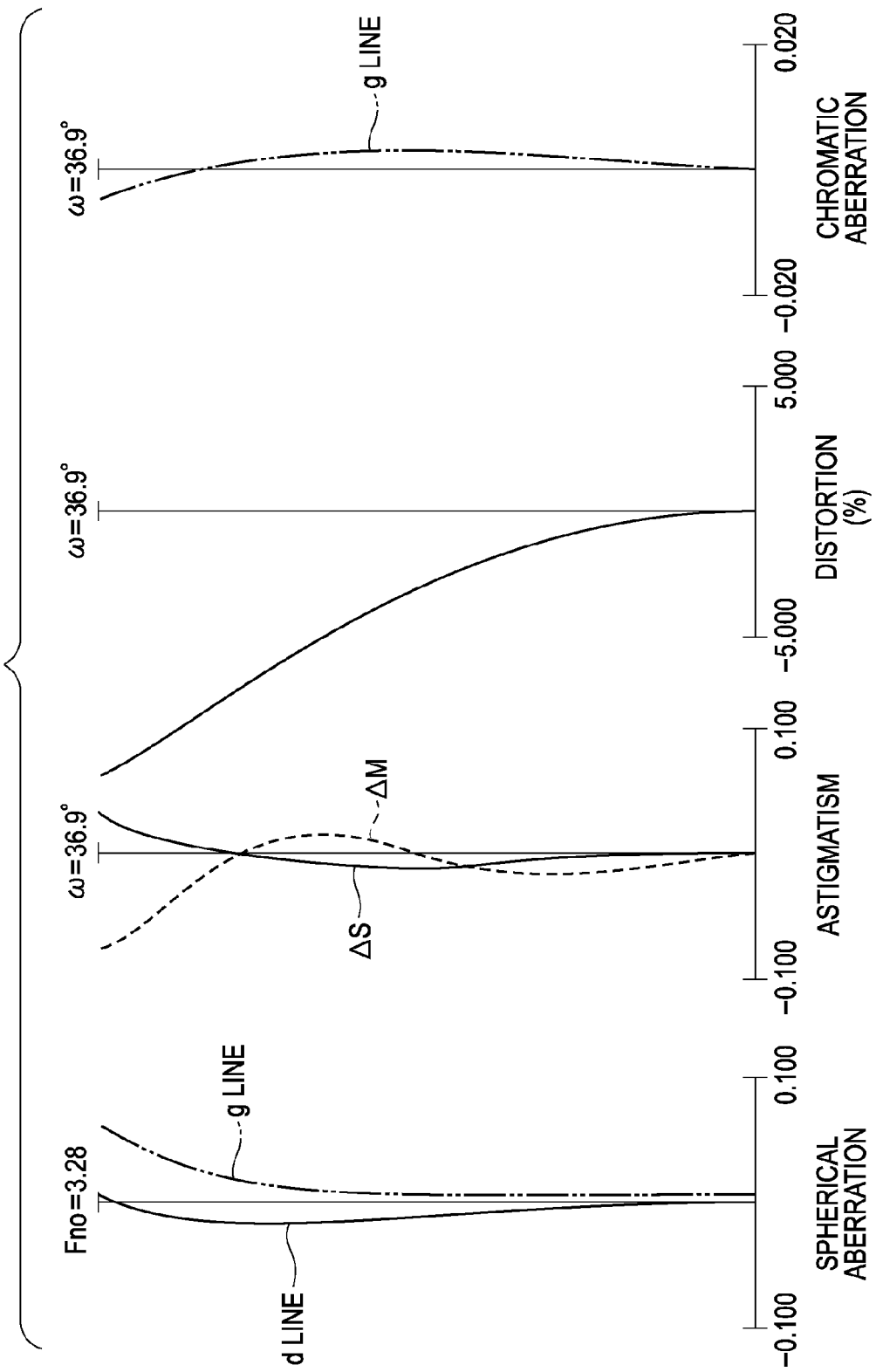

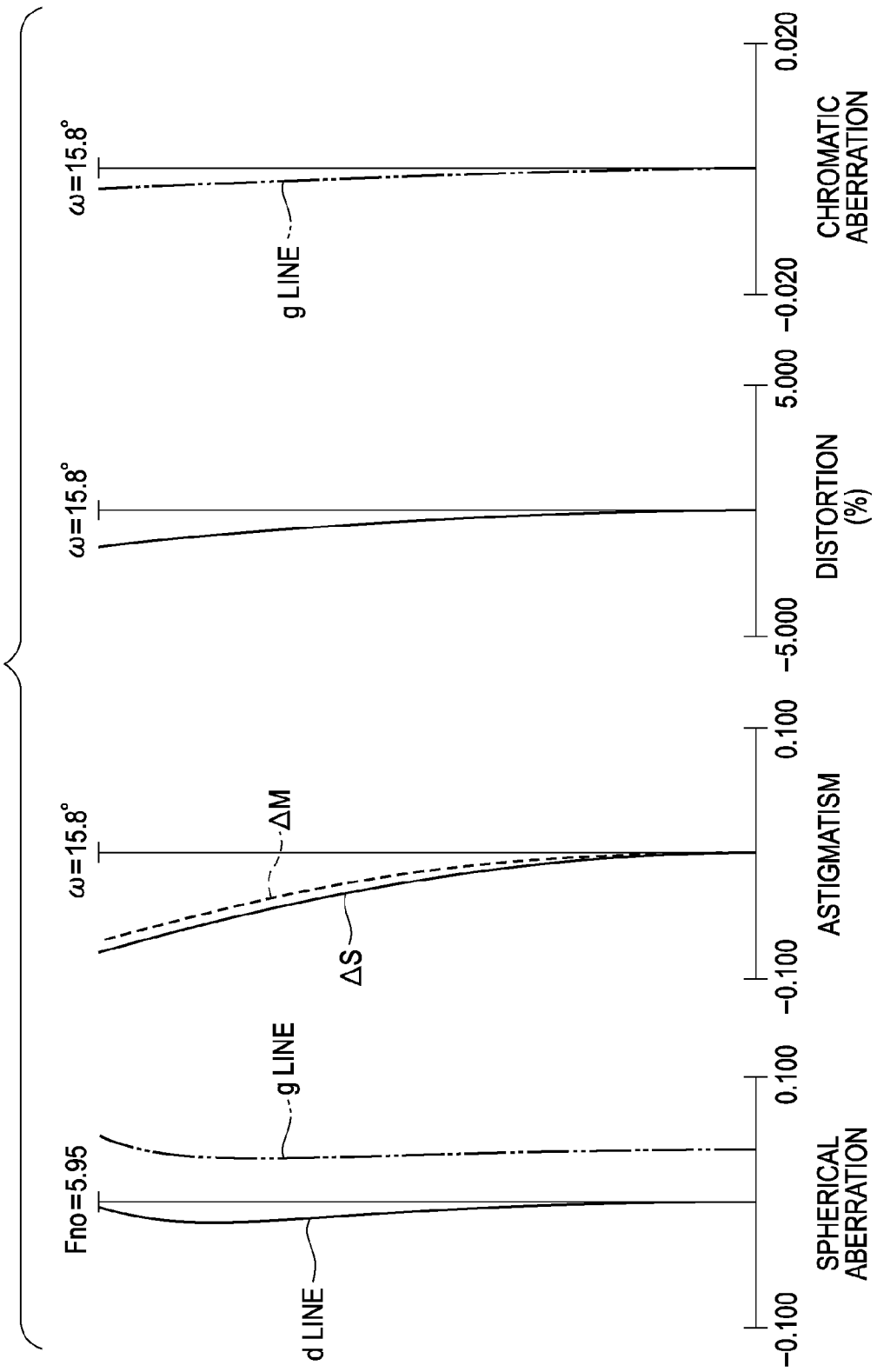

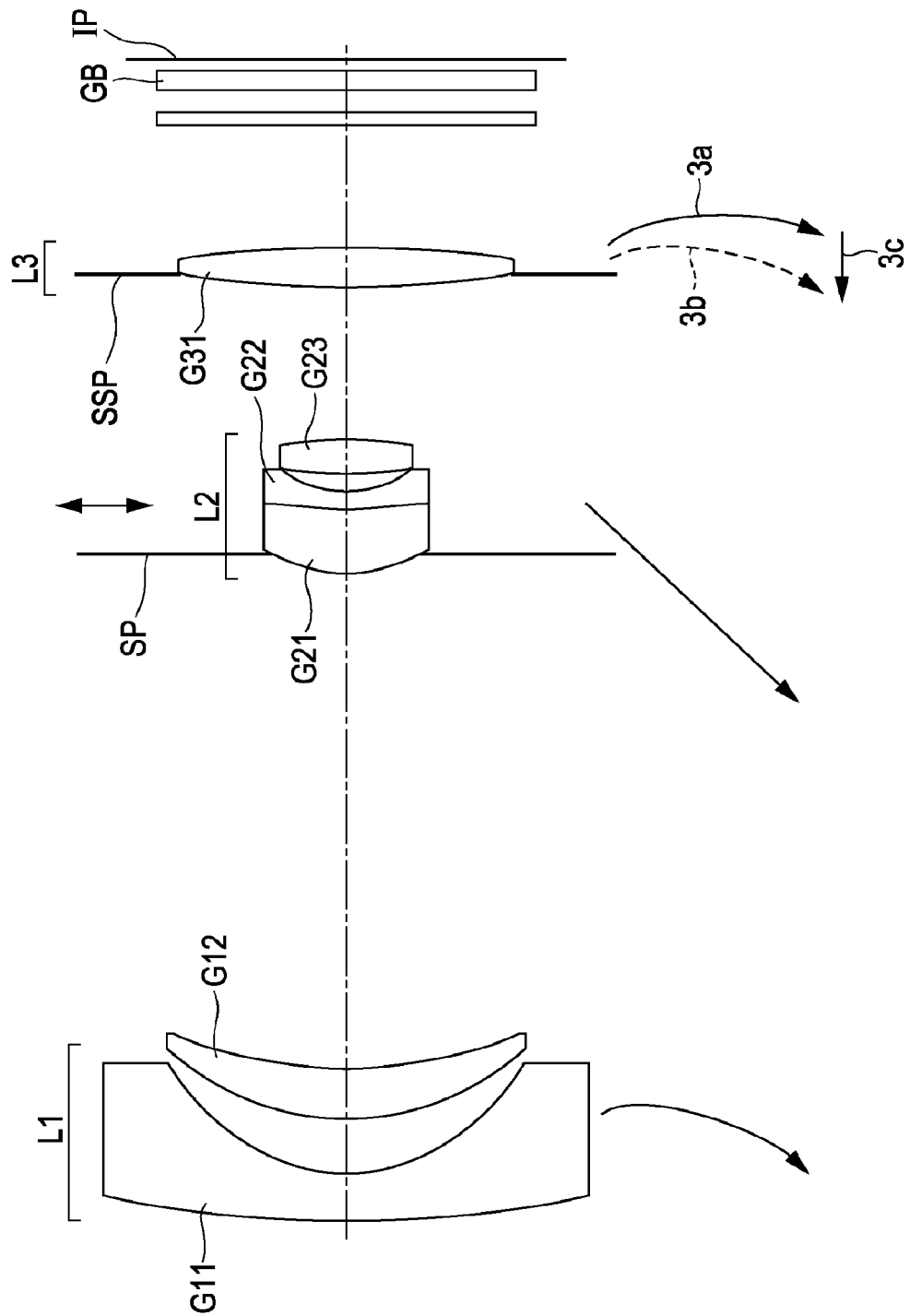

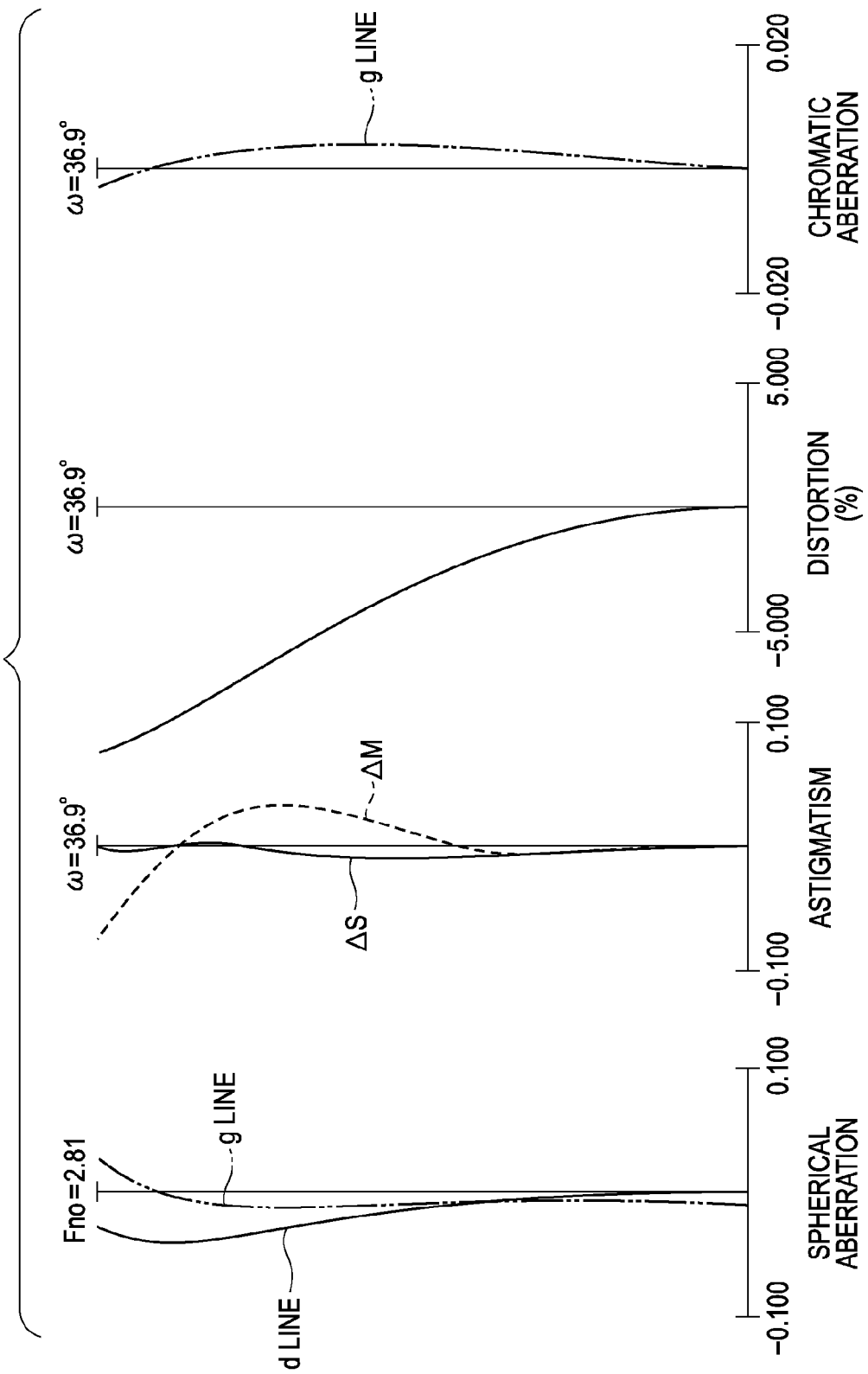

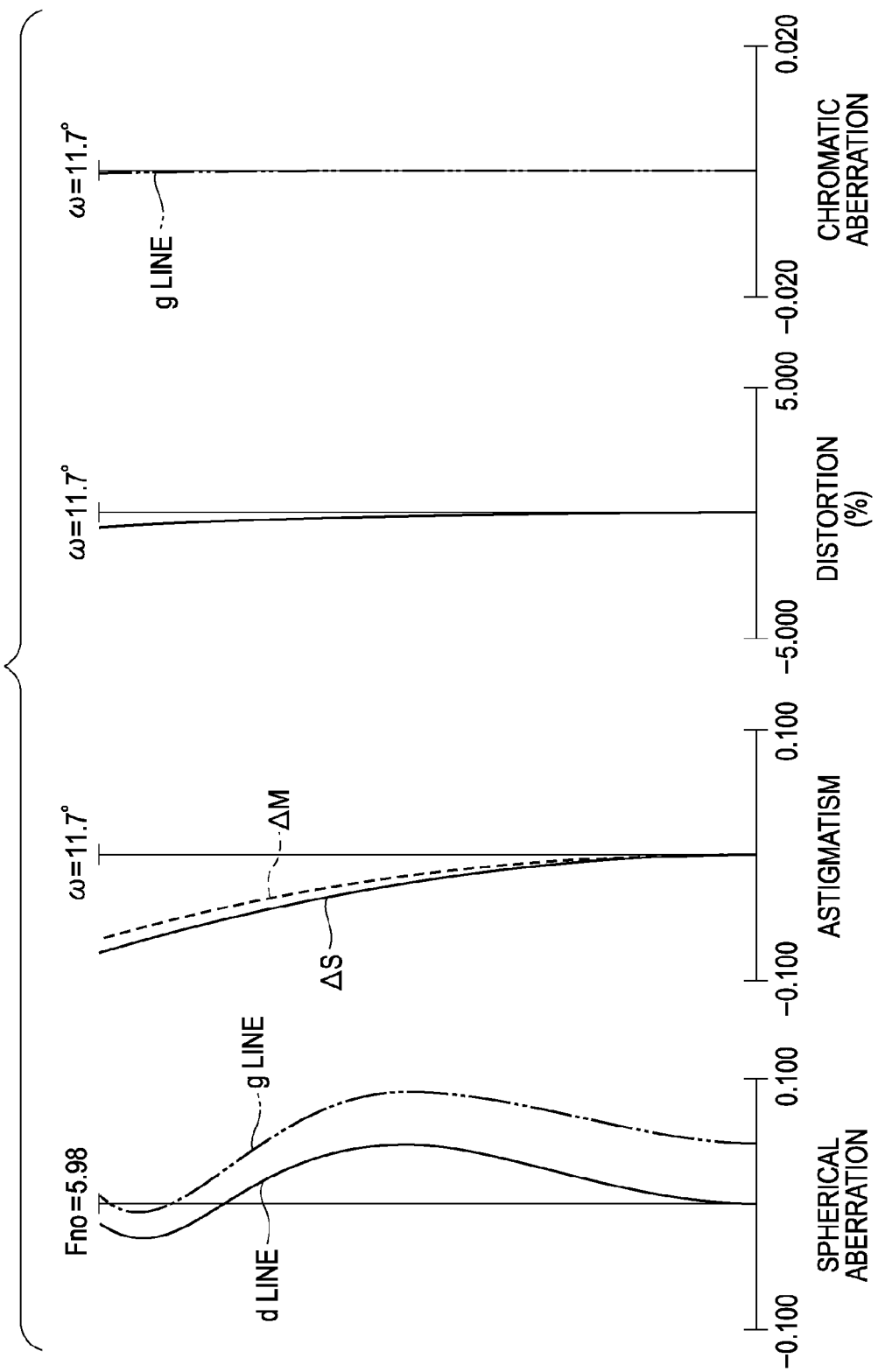

ZOOM LENS AND IMAGE PICKUP APPARATUS USING THE SAME

BACKGROUND OF THE INVENTION

1. Field of the Invention

The present invention relates to a zoom lens, which is suitable for an image pickup apparatus such as a digital still camera, a video camera, a film camera, or a TV camera.

2. Description of the Related Art

Recently, image pickup apparatuses (cameras) using solid-state image pickup devices, such as video cameras and digital still cameras, have become smaller with increased functionality. Optical systems used in these cameras have been demanded to be small-sized zoom lenses with high optical performance. In any of these cameras using solid-state image pickup devices, various kinds of optical components such as an optical low-pass filter and a color correction filter are arranged between a lens system and the image pickup device. Therefore, the optical system for use in such a camera requires a lens system with a relatively long back focal length.

For a color camera with an image pickup device for color images, an optical system with good telecentricity on the image side is desired to avoid color shading. As a zoom lens with a reduced total system size and a long back focus and good telecentricity on the image side, a negative-lead zoom lens in which a lens unit with a negative refractive power is provided as a leading unit (located nearest to the object side) has been known in the art.

As the negative-lead zoom lens, a zoom lens comprising three lens units (hereinafter, also referred to as a three-unit zoom lens) has been known in the art. The three-unit zoom lens includes a first lens unit having a negative refractive power, a second lens unit with a positive refractive power, and a third lens unit with a positive refractive power in order from the object side to the image side (see, for example, Japanese Patent Laid-Open No. 2003-131132, U.S. Publication No. 2008/0043341, and U.S. Pat. No. 7,289,275).

As one kind of the three-unit zoom lens, a small-sized three-unit zoom lens in which all of the lens units move while zooming to achieve a high zoom ratio has been known (see, for example, Japanese Patent Laid-Open No. 2004-061675 and U.S. Pat. No. 7,333,275).

For reducing a total system size while attaining a high zoom ratio in the negative-lead type three-unit zoom lens, it is effective to reduce the number of lenses in each lens unit of the zoom lens and enhance the refractive power of each lens unit.

However, for example, an increase of aberration variation occurs when zooming if the refractive power of each lens unit is simply enhanced to achieve a high zoom ratio. Thus, the zoom lens hardly obtains high optical performance in the entire zoom range.

Therefore, for reducing a total system size, extending an angle of view, and enhancing a zoom ratio in the negative-lead three-unit zoom lens, it is important to appropriately determine the configuration of lenses in each lens unit, the distribution of refractive power in each lens unit. It is also important to appropriately define the moving locus or the like of each lens unit at the time of zooming.

For example, it is difficult to obtain high optical performance while reducing a total system size and extending an angle of view if the configuration of lenses, the refractive power, or the like in the first lens unit are not defined appropriately. In addition, in a three-unit zoom lens employing a rear-focusing system where the third lens group moves when zooming and focusing, it is also important to appropriately define the refractive power, the configuration of lenses, or the like in the third lens unit.

If the configuration of lenses in each lens unit is not appropriately defined, aberrations vary more extensively when zooming and focusing. Thus, it becomes very difficult to obtain high optical performance with respect to the whole zooming range and the entire object distance.

SUMMARY OF THE INVENTION

The present invention provides a zoom lens that includes a first lens unit with a negative refractive power, a second lens unit with a positive refractive power, and a third lens unit with a positive refractive power in order from the object side to the image side. The first lens unit includes a negative lens and a positive lens. If the curvature radius of the object side surface and that of the image side surface of the negative lens are respectively defined as R11 and R12 and the curvature radius of the object side surface and that of the image side surface of the positive lens are respectively defined as R21 and R22, the following conditional expression is satisfied:

$$-5.6 < (R12+R21)/(R12-R21) < -4.7 \text{ and}$$

$$1.5 < (R11+R22)/(R1-R22) < 2.3.$$

According to the present invention, a zoom lens with high optical performance for the entire zoom range and the entire object distance is achieved while the entire lens system is reduced in size.

Further features of the present invention will become apparent from the following description of exemplary embodiments (with reference to the attached drawings).

BRIEF DESCRIPTION OF THE DRAWINGS

FIG. 1 is a cross-sectional view of a zoom lens at a wide angle end according to a first embodiment of the present invention.

FIGS. 2A, 2B, and 2C illustrate aberration diagrams at a wide angle end, middle zooming position, and a telephoto end of the zoom lens according to the first embodiment of the present invention, respectively.

FIG. 3 is a cross-sectional view of a zoom lens at a wide angle end according to a second embodiment of the present invention.

FIGS. 4A, 4B, and 4C illustrate aberration diagrams at a wide angle end, middle zooming position, and telephoto end of the zoom lens according to the second embodiment of the present invention, respectively.

FIG. 5 is a cross-sectional view of a zoom lens at a wide angle end according to a third embodiment of the present invention.

FIGS. 6A, 6B, and 6C illustrate aberration diagrams at a wide angle end, a middle zooming position, and a telephoto end of the zoom lens according to the third embodiment of the present invention, respectively.

FIGS. 8A, 8B, and 8C illustrate aberration diagrams at a wide angle end, middle zooming position, and a telephoto end of the zoom lens according to the fourth embodiment of the present invention, respectively.

FIG. 9 is a cross-sectional view of a zoom lens at a wide angle end according to a fifth embodiment of the present invention.

FIG. 10 includes aberration diagrams at the wide angle end in the fifth embodiment, where FIGS. 10A, 10B, and 10C illustrate different aberration diagrams, respectively.

DESCRIPTION OF THE EMBODIMENTS

A zoom lens according to any of the exemplary embodiments of the present invention includes a first lens unit with a negative refractive power, a second lens unit with a positive refractive power, and a third lens unit with a positive refractive power in order from the object side to the image side.

The lens units move independently during zooming.

Also, focusing is performed by moving the third lens unit.

Alternatively, the zoom lens of any embodiment of the present invention may be provided with an additional lens unit having a refractive power at least on either of the object side of the first lens unit or the image side of the third lens unit in addition to the aforementioned three-unit zoom lens.

FIG. 1 is a cross-sectional view of a zoom lens at a wide angle end of the zoom lens according to a first embodiment of the present invention. FIGS. 2A, 2B, and 2C illustrate aberration diagrams at a wide angle end, middle zooming position, and a telephoto end of the zoom lens according to the first embodiment of the present invention, respectively. The zoom lens of the first embodiment has a zoom ratio of 2.86, an aperture ratio of about 3.28 to 5.97.

FIG. 3 is a cross-sectional view of a zoom lens at a wide angle end according to the second embodiment of the present invention. FIGS. 4A, 4B, and 4C illustrate aberration diagrams at a wide angle end, middle zooming position, and a telephoto end (long focal length end) of the zoom lens according to a second embodiment of the present invention, respectively. The zoom lens of the second embodiment has a zoom ratio of 2.86, an aperture ratio of about 3.28 to 5.97.

Figure 6C:
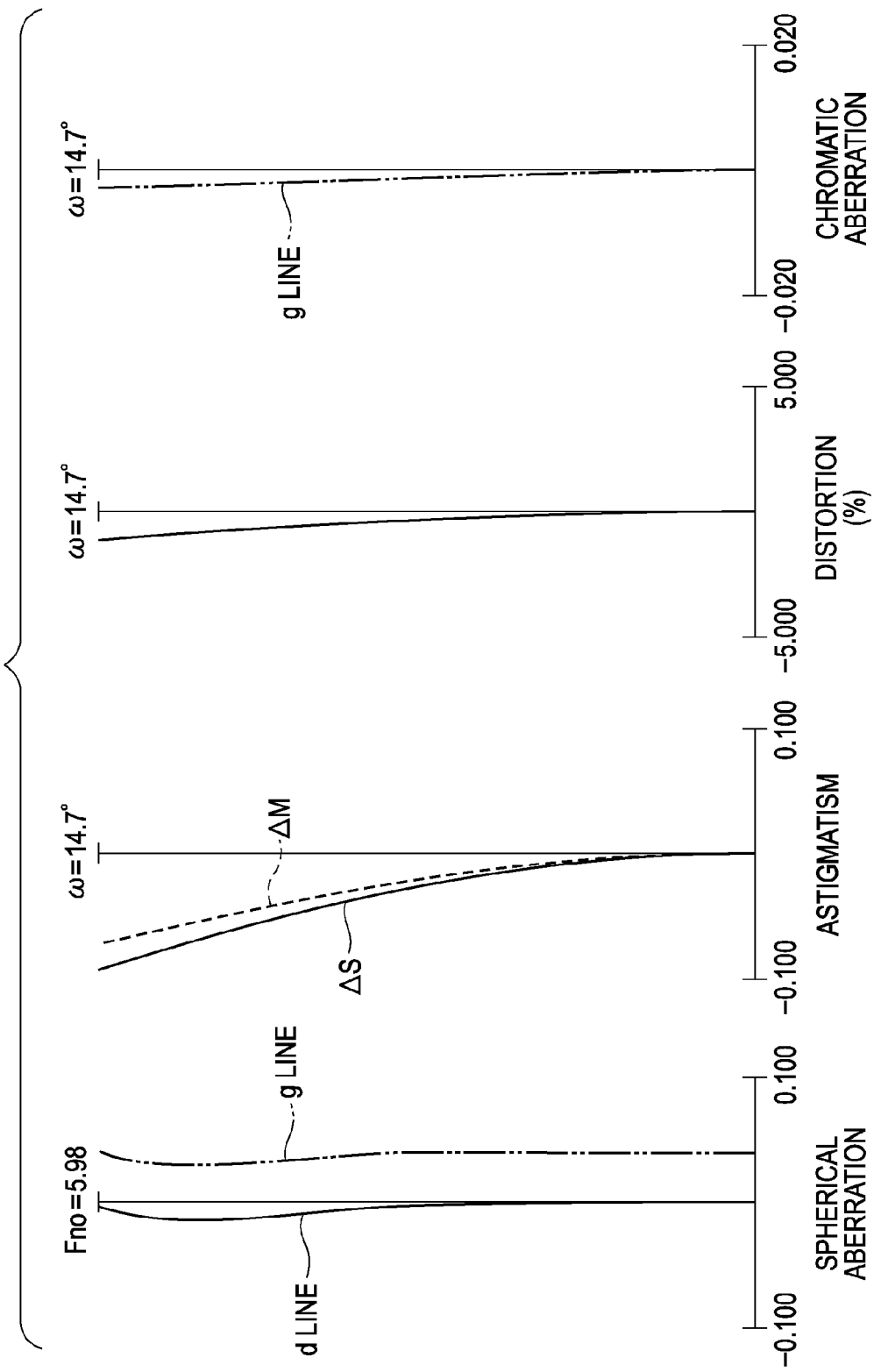

FIG. 5 is a cross-sectional view of a zoom lens at a wide angle end according to a third embodiment of the present invention. FIGS. 6A, 6B, and 6C illustrate aberration diagrams at a wide angle end, a middle zooming position, and a telephoto end of the zoom lens according to the third embodiment of the present invention, respectively. The zoom lens of the third embodiment has a zoom ratio of 2.86, an aperture ratio of about 3.28 to 5.98.

Figure 7:
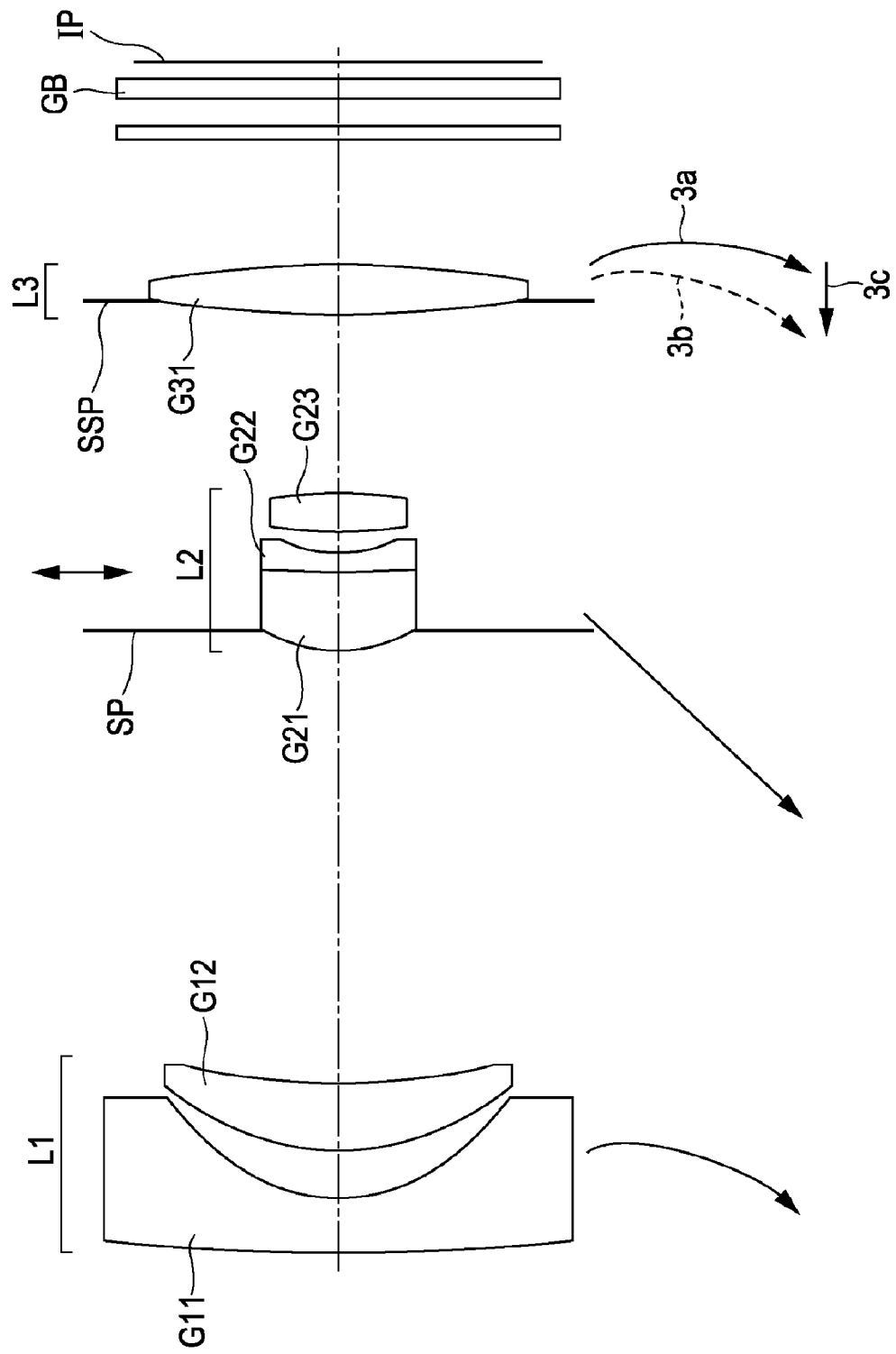
FIG. 7 is a cross-sectional view of a zoom lens at a wide angle end according to a fourth embodiment of the present invention.
Figure 8B:
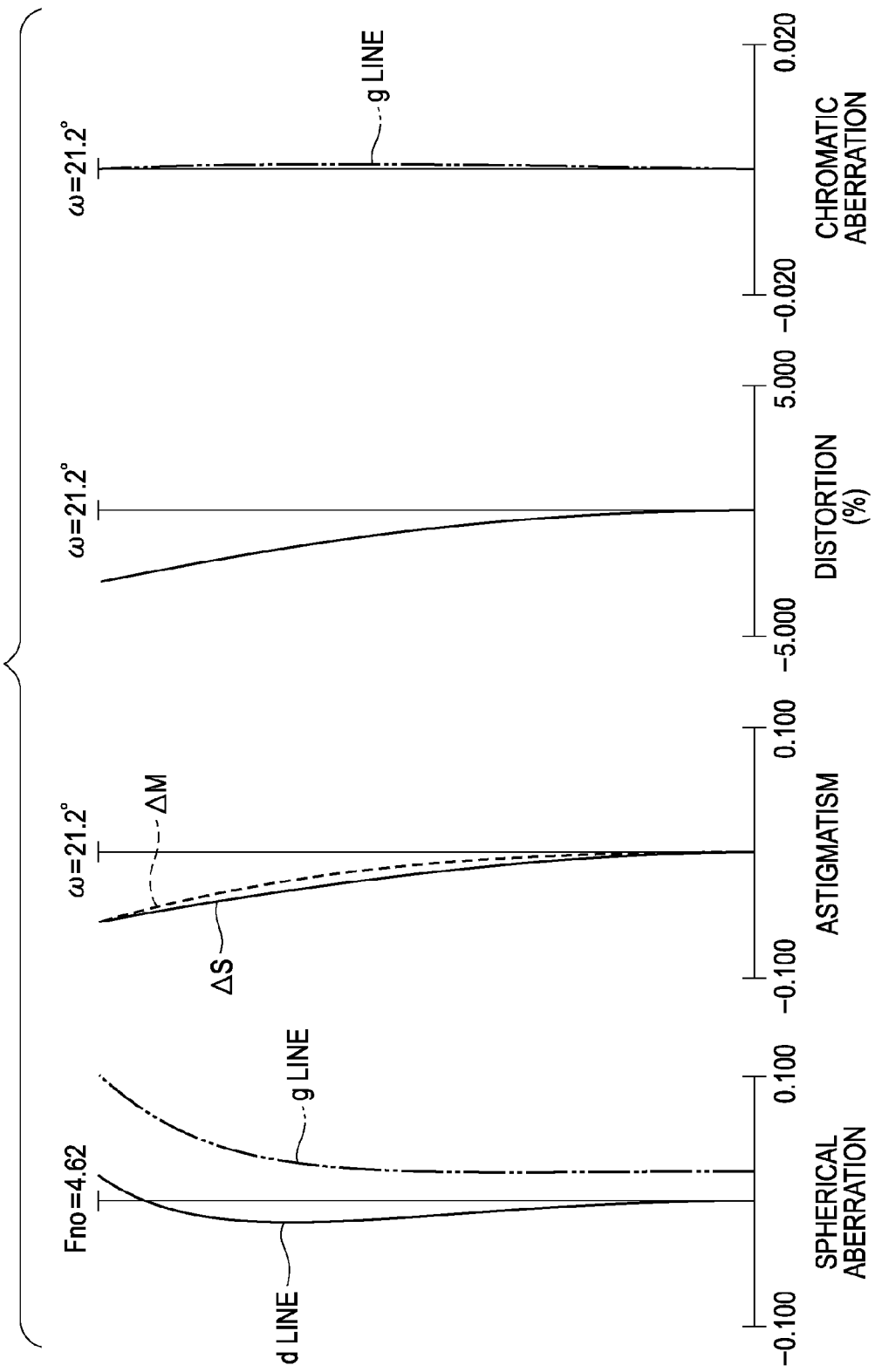

FIG. 7 is a cross-sectional view of a zoom lens at a wide angle end according to a fourth embodiment of the present invention. FIGS. 8A, 8B, and 8C illustrate aberration diagrams at a wide angle end, middle zooming position, and a telephoto end of the zoom lens according to the fourth embodiment of the present invention, respectively. The zoom lens of the fourth embodiment has a zoom ratio of 2.86, an aperture ratio of about 3.28 to 5.95.

Figure 10B:
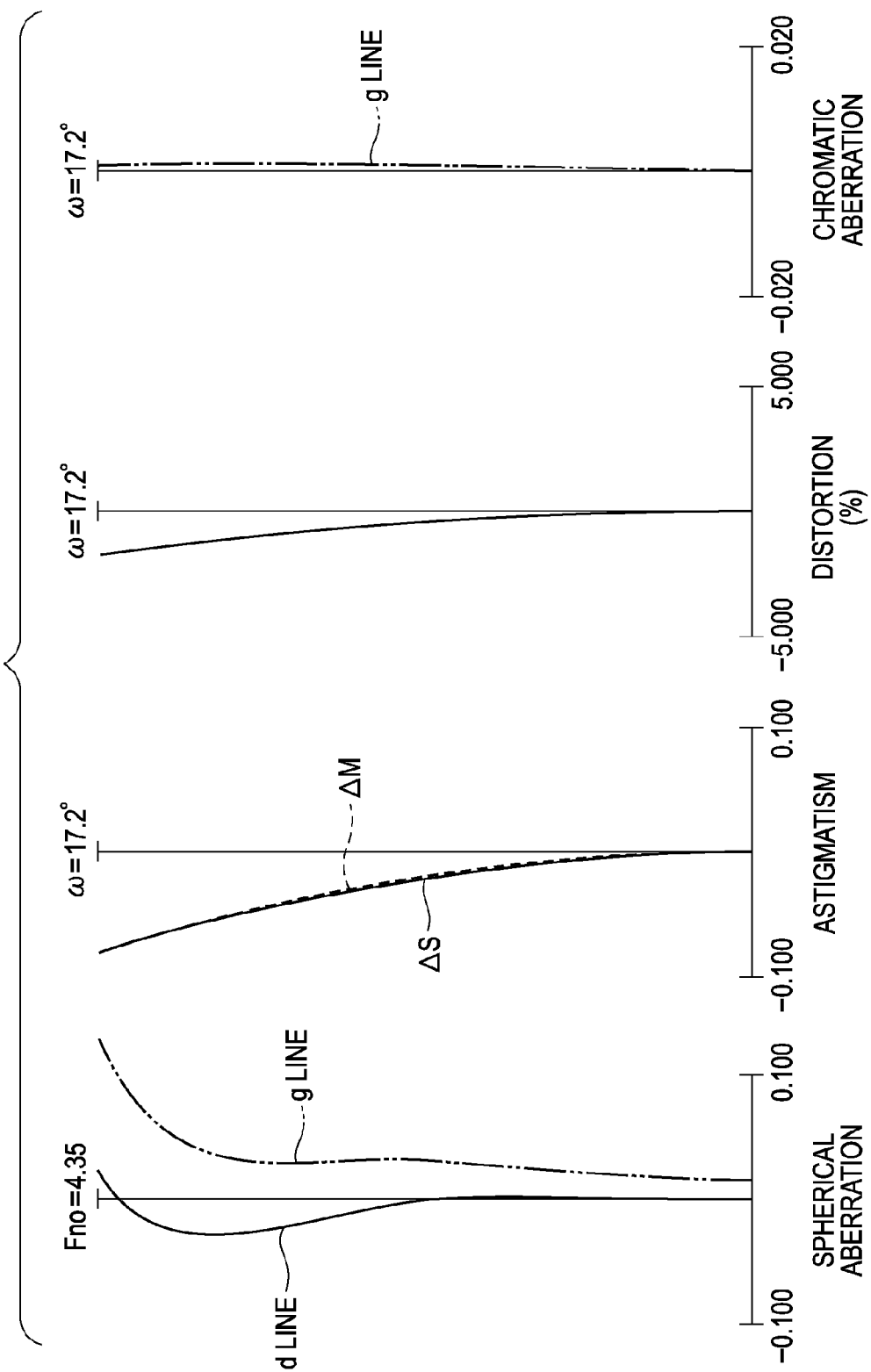

FIG. 9 is a cross-sectional view of a zoom lens at a wide angle end according to a fifth embodiment of the present invention. FIGS. 10A, 10B, and 10C illustrate aberration diagrams at a wide angle end, middle zooming position, and a telephoto end of the zoom lens according to the fifth embodiment of the present invention, respectively. The zoom lens of the fifth embodiment has a zoom ratio of 3.92, an aperture ratio of about 2.81 to 5.98.

Figure 11:
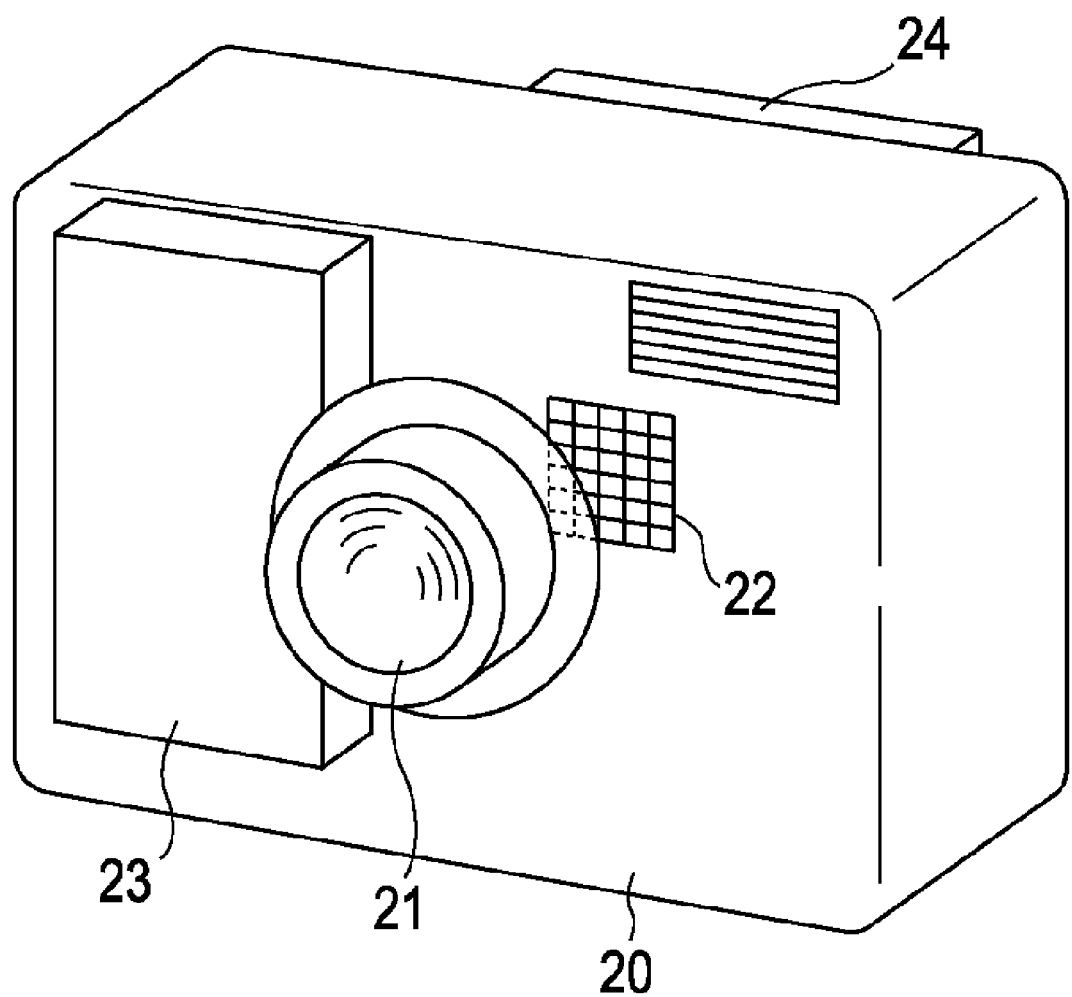
FIG. 11 is a schematic diagram illustrating the principal part of an image pickup apparatus according to an embodiment of the present invention.

FIG. 11 is a schematic diagram illustrating the principal part of a digital-still camera equipped with the zoom lens of according to any of the embodiments of the present invention. The zoom lens of any of the embodiments serves as an image-taking optical system used in the image pickup apparatus. In the cross-sectional view of the zoom lens, the left side is an object side (front side) and the right side is an image side (rear side).

When the zoom lens of any of the embodiments is used as a projection lens of a projector or the like, a screen is provided on the left side and an image to be projected thereon is provided on the right side in the cross-sectional view.

In the cross sectional view of the lens, L1 represents a negative refractive index (an optical power=the inverse number of focal length) of a first lens unit, L2 represents a positive refractive index of a second lens unit, and L3 represents a positive refractive index of a third lens unit.

SP denotes an F-number determining member that acts as an aperture stop that determines (restricts) an open F number (Fno). (Hereinafter, F-number determining member is also referred to as an "aperture stop").

SSP is a flare-cut stop.

GB is an optical block equivalent to a light filter, a faceplate, crystal optical low-pass filter, an infrared cut off filter, or the like.

IP is an image plane. When it is used as a photographic optical system such as a video camera or a digital still camera, the imaging plane of solid-state image pickup device of a solid-state pickup device (photoelectric conversion element), such as a CCD sensor and a CMOS sensor, is placed.

In the spherical aberration diagram among the aberration diagrams, d and g lines are shown. In addition, Fno denotes F-number. In the astigmatism diagram, $\Delta M$ denotes a meridional image surface and $\Delta S$ denotes a sagittal image surface. The g line represents chromatic aberration of magnification. In addition, $\omega$ denotes a half angle of view.

Furthermore, in each of the embodiments, the "wide angle end" and the "telephoto end" each refer to a zoom position at which a magnifying lens unit (second lens unit L2) is located at an edge of a range in which it is mechanically movable along the optical axis.

In the cross-sectional view of the lens, each lens unit is moved during zooming from the wide angle end to the telephoto end as indicated with an arrow.

In the zoom Lens of each embodiment, during zooming from the zoom position at the wide angle end to the zoom position at the telephoto end, the first lens unit L1 draws part of a locus convex toward the image side while carrying out a substantially reciprocating movement to correct variation of the image plane which may occur during zooming. The second lens unit L2 simply moves to the object side to carry out principal zooming.

The third lens unit L3 moves while drawing part of a locus convex toward the image side. Each of the lens units moves so that the interval between the first lens unit L1 and the second lens unit L2 becomes small and the interval between the second lens unit L2 and the third lens unit L3 becomes large during zooming from the wide angle end to the telephoto end.

In addition, the zoom lens employs a rear-focusing system where the third lens unit L3 moves along the optical axis to carry out focusing. A solid curved line 3a and a dotted curved line 3b for the third lens unit L3 each indicates a moving locus for correcting an image plane variation, which may occur during zooming at the time of focusing on an object at infinity and a near object, respectively.

During focusing from the object at infinity to the near object at the telephoto end, the third lens unit L3 moves forward (to the object side) as indicated with an arrow 3c. For focusing, the first lens unit L1 does not move. Alternatively, it may be moved if required for aberration correction. In each of the embodiment, the entire second lens unit L2 is displaced so that the movement of the second lens unit L2 will have a component perpendicular to the optical axis to correct blurring of an image when the zoom lens receives vibrations. Alternatively, instead of shifting the entire second lens unit L2, part of the second lens unit L2 may be displaced to correct burring of an image.

In the zoom lens of each embodiment, the first lens unit includes a negative lens and a positive lens.

The curvature radius of the object side surface of the negative lens is defined as R11 and the curvature radius of the image side surface thereof is defined as R12. Likewise, the curvature radius of the object side surface of the positive lens is defined as R21 and the curvature radius of the image side surface thereof is defined as R22. In this case, R11, R12, R21, and R22 satisfy the following conditional expression:

$$-5.6 < (R12+R21)/(R12-R21) < -4.7 \quad (1)$$

$$1.5 < (R11+R22)/(R11-R22) < 2.3 \quad (2)$$

To downsize the entire system at the wide angle of view, each embodiment employs a three-unit zoom lens consisting of lens units respectively having negative, positive, and positive refractive-powers in order from the object side. Then, the lens shape of the negative lens and the lens shape of the positive lens are designed to satisfy both conditional expressions (1) and (2). Therefore, distortion aberration is appropriately corrected especially when attaining the wide angle of view.

The conditional expression (1) is responsible for the shape of an air lens between the negative lens and the positive lens that constitute the first lens unit L1.

If the value is lower than the lower limit of the conditional expression (1), it is advantageous to correct distortion aberration. However, the under correction of spherical aberration occurs at the telephoto end and is hardly corrected.

On the other hand, if the value exceeds the upper limit of the conditional expression (1), the curvature of image surface occurring at the wide angle end is overcorrected and the spherical aberration at the telephoto end is also overcorrected. These over correction states are hardly corrected.

The conditional expression (2) is responsible for the lens shape of the incident surface of the first lens unit L1 (first lens surface) and the lens shape of the emergent surface thereof (fourth lens surface).

If the value is lower than the lower limit of the conditional expression (2), it is difficult to correct spherical aberration at the telephoto end.

On the other hand, if the value exceeds the upper limit of the conditional expression (2), the effective diameter of the front lens is increased. It becomes difficult to reduce the size of the entire system.

Furthermore, in each embodiment, the numerical ranges of the conditional expressions (1) and (2) can be set for the aberration amendment as follows:

$$-5.55 < (R12+R21)/(R12-R21) < -4.75 \quad (1a)$$

$$1.5 < (R11+R22)/(R11-R22) < 2.2 \quad (2a)$$

In each embodiment, each lens unit is constructed as described above to minimize the entire lens system. In spite of a simple Lens configuration, high optical performance can be obtained with respect to an entire zooming range and an entire object distance.

In addition, to attain a further improvement in optical performance or a further reduction in size of the zoom lens of each embodiment, it can satisfy any one of configurations described below. Therefore, advantageous effects corresponding to the respective configurations will be obtained.

The third lens unit L3 includes a positive lens. The curvature radius of the object side surface of the positive lens is defined as R31 and that of the image side surface thereof is defined as R32.

"f1" denotes the focal length of the first lens unit. "f2" denotes the focal length of the second lens unit. "f3" denotes the focal length of the third lens unit. In addition, "fw" denotes the focal length of the entire system at the wide angle end.

"D1" denotes the distance between the surface vertex of the first lens unit L1 located closest to the object side and the surface vertex thereof located closest to the image side on the optical axis.

In this case, it can satisfy at least one of the following conditional expressions:

$$-0.4 < (R31+R32)/(R31-R32) < 0.2 \quad (3)$$

$$-0.6 < f1/f3 < -0.3 \quad (4)$$

$$1.4 < f2/fw < 2.0 \quad (5)$$

$$-0.45 < D1/f1 < -0.25 \quad (6)$$

Technical meanings of the respective conditional expressions will be described.

The conditional expression (3) is responsible for the shape of a lens on the incident surface (object side surface) of the positive lens of the third lens unit L3 and the shape of a lens on the emergent surface (image side surface) thereof.

If the value is lower than the lower limit of the conditional expression (3), the curvature of the image side surface is smaller than that of the object side surface. When focusing from an object at infinity to a near object at the wide angle end, an increase in image plane variation occurs and is difficult to be corrected.

On the other hand, if it exceeds the upper limit, the curvature of the image side surface is larger than that of the object side surface. When focusing from an object at infinity to a near object at the telephoto end, an increase in image plane variation occurs and is difficult to be corrected.

The conditional expression (4) is responsible for power distribution (refractive power distribution) between the first lens unit L1 and the third lens unit L3. If the value is lower than the lower limit of the conditional expression (4), over correction of the curvature of field at the wide angle end occurs and is hardly corrected.

On the other hand, if the value exceeds the upper limit of the conditional expression (4), the power of the third lens unit L3 decreases. Such a decrease in power is not preferable because of an increase in amount of movement of the third lens unit L3 when focusing from an object at infinity to a near object and an increase in variation of the curvature of field.

The conditional expression (5) is responsible for the power distribution of the second lens unit L2 with respect to the focal length at the wide angle end. If the value is lower than the lower limit of the conditional expression (5), the power of the second lens unit L2 increases and the lens total length is shortened. However, a variation in curvature of field when zooming increases and is hardly corrected.

On the other hand, if the value exceeds the upper limit, the power of the second lens unit L2 decreases while the amount of movement when zooming increases. As a result, the entire system is hardly minimized.

The conditional expression (6) is responsible for the ratio of the total thickness of the first lens unit L1 in the optical axis direction to the focal length of the first lens unit L1. If the value is lower than the lower limit of the conditional expression (6), an air distance between the first lens and the second lens in the first lens unit L1 increases and the thickness thereof increases. Thus, it is not preferable because of an increase in thickness of the entire system when retracting.

On the other hand, if the value exceeds the upper limit of the conditional expression (6), the power of the first lens unit L1 decreases while the amount of movement thereof increases when zooming. Thus, the entire system is hardly minimized.

Furthermore, in each example, the numerical ranges of the respective conditional expressions (3) to (6) can be defined as follows:

$$-0.35<(R31+R32)/(R31-R32)<0.15 \quad (3a)$$

$$-0.55<f1/f3<-0.35 \quad (4a)$$

$$1.45<f2/fw<1.90 \quad (5a)$$

$$-0.4<D1/f1<-0.3 \quad (6a)$$

As described above, in the zoom lens of each embodiment, the configuration of each lens unit (i.e., especially the lens shape of each lens of the first lens unit, the power distributions of the respective lens units, and so on) is appropriately defined. Therefore, the zoom lens is provided with a wide angle of view, a zoom ratio of almost 3× or 4×, compactness, and high optical performance over the entire zooming range from the wide angle end to the telephoto end and the entire object distance from an object at infinity to a near object.

Furthermore, the zoom lens of each embodiment can be subjected to the process of correcting a distortion aberration by an electric technique when used in an image pickup apparatus. Alternatively, when using a camera capable of accepting distortion aberration to some extent, such as a monitoring camera, it may be used as it is.

Next, the lens configuration of the zoom lens according to each embodiment will be described.

Each embodiment employs the zoom lens of a negative-lead type in which a lens unit with a negative refractive power is provided as a leading unit to facilitate a long back focus by shifting a rear principal point position to the image side.

In addition, the third lens unit located closest to an image-pickup element (image plane) is provided as a lens unit with a positive refractive power to obtain a good telecentricity on the image side, thereby allowing the third lens unit to function as a field lens.

The first lens unit L1 includes a meniscus-shaped negative lens G11 whose lens surface on the object side has a convex shape and a meniscus-shaped positive lens G12 whose lens surface on the object side has a convex shape in order from the object side to the image side.

The second lens unit L2 includes: a cemented lens composed of a positive lens G21 whose lens surface on the object side has a convex shape and a negative lens G22 whose lens surface on the image side is concaved shaped; and a positive lens G23 both of whose lens surfaces have a convex shape.

The third lens unit includes a single positive lens G31 both of whose lens surfaces have a convex shape.

A F-number determining member SP is arranged between the object side vertex of the lens G21 located closest to the object side of the second lens unit L2 and an intersection of the object side surface of the lens of the lens G21 and the peripheral part (edge part) thereof.

Thus, the F-number determining member SP is placed in the second lens unit L2 and moved together with the second lens unit L2 when zooming to shorten the interval between the entrance pupil and the first lens unit L1 on the wide angle side.

As the F-number determining member SP is placed as described above, the interval between the first lens unit L1 and the second lens unit L2 on the telephoto end can be shortened. Thus, a sufficient amount of movement of the second lens unit L2 to the object side can be obtained for zooming. Therefore, it prevents the zoom lens from an increase in lens total length at the telephoto end while obtaining a high zoom ratio.

Like the F-number determining member SP, a flare-cut stop SSP is arranged between the object side vertex of the lens G31 of the third lens unit L3 and the intersection of the object side surface of the 31 lens G31 and the peripheral part (edge part) thereof.

In each embodiment, as the lens units are respectively configured as described above, the total lens system can be compacted while keeping optical performance.

The moving locus or the like thereof can be appropriately determined as described above. As a result, a zoom lens with high optical performance, such as a wide angle of view and a high zoom ratio, suitable for a retractable zoom lens system is attained.

Furthermore, a zoom lens with high optical performance is obtained by effectively introducing an aspherical surface into the lens unit to carry out correction of off-axis aberrations, particularly the curvature of field at the wide angle end and the spherical aberration at the time of attaining a large aperture ratio.

Next, numerical examples of the present invention will be described. In each numerical example, the letter "i" denotes an order of surfaces from the object side and "ri" denotes the curvature radius of the lens surface. In addition, "di" denotes a lens thickness and an air interval between the "i" surface and the "i+1" surface. Furthermore, "ndi" and "vdi" denote an refractive index and an Abbe number with respect to the d line, respectively. The symbol "*" represents an aspheric surface.

In addition, four surfaces located closest to the image side are glass materials such as faceplates. It is referred to as four units in the numerical examples. Also, k, A4, A6, A8, and A10 are aspheric surface coefficients. When "x" denotes a displacement from a surface vertex along the optical axis in a position at a height "h" from the optical axis, the aspheric shape is expressed as follows:

$$x=(h^2/R)/[1+\{1-(1+k)(h/R)^2\}^{1/2}]+A4 \cdot h+A6 \cdot h^6+A8 \cdot h^8+A10 \cdot h^{10}$$

wherein R represents a paraxial radius of curvature. In addition, the relationship between each of the above conditional expressions and each of the numerical examples will be shown in Table 1.

In each numerical example, the value of d5 is negative because of counting the F-number determining member and the 21st lens G21 of the second lens unit L2 in order from the object side.

As a concrete configuration, the F-number determining member (aperture stop) SP is shifted only an absolute value of d5 from the object side vertex of the 21st lens G21 on the object side of the second lens unit L2 to the image side.

Although a value of d11 is negative with respect to the flare-cut stop SSP, this is because it is treated equal to the F-number determining stop SP.

Numerical Example 1

Surface Data

| Surface No. | r | d | nd | vd | Effective diameter |
|---|---|---|---|---|---|
| 1* | 7.278 | 0.20 | 1.84862 | 40.0 | 1.55 |
| 2* | 0.731 | 0.18 | | | 1.21 |
| 3 | 1.056 | 0.26 | 1.84666 | 23.8 | 1.22 |
| 4 | 2.490 | (variable) | | | 1.15 |
| 5 | SP | −0.07 | | | 0.63 |
| 6* | 0.649 | 0.28 | 1.85960 | 40.4 | 0.63 |
| 7 | 2.670 | 0.08 | 1.80809 | 22.8 | 0.54 |
| 8 | 0.546 | 0.08 | | | 0.49 |
| 9 | 2.042 | 0.16 | 1.77250 | 49.6 | 0.50 |
| 10 | −2.902 | (variable) | | | 0.55 |
| 11 | SSP | −0.05 | | | 1.39 |
| 12 | 4.704 | 0.19 | 1.60311 | 60.6 | 1.39 |
| 13 | −6.035 | (variable) | | | 1.40 |
| 14 | ∞ | 0.05 | 1.51633 | 64.1 | 3.29 |
| 15 | ∞ | 0.12 | | | 3.29 |
| 16 | ∞ | 0.08 | 1.51633 | 64.1 | 3.29 |
| 17 | ∞ | | | | 3.29 |
| Image plane | ∞ | | | | |

Aspherical Surface Data

First surface

K = 2.51937e+001  A4 = −9.27061e−003  A6 = −1.55886e−002
A8 = 3.33568e−002  A10 = −4.61682e−003

Second surface

K = −1.98139e−001  A4 = −7.64306e−002  A6 = −1.08012e−001
A8 = −1.71019e−001  A10 = −4.31884e−002

Sixth surface

K = −9.98554e−001  A4 = 2.99388e−001  A6 = 3.01704e−001

Various Data
Zoom ratio 2.86

| | Wide-angle | Middle | Telephoto |
|---|---|---|---|
| Focal distance | 1.00 | 1.92 | 2.86 |
| F-number | 3.28 | 4.63 | 5.97 |
| Angle of view Angle of view | 32.5 | 18.4 | 12.6 |
| Image height | 3.88 | 3.88 | 3.88 |
| Lens total length | 4.72 | 4.40 | 4.82 |
| BF | 0.77 | 0.71 | 0.72 |
| d4 | 1.74 | 0.58 | 0.16 |
| d10 | 0.91 | 1.80 | 2.64 |
| d13 | 0.50 | 0.45 | 0.45 |
| Position of entrance pupil | 1.07 | 0.66 | 0.42 |
| Position of exit pupil | −2.59 | −5.05 | −10.35 |
| Front principal point position | 1.69 | 1.86 | 2.49 |
| Rear principal point position | −0.94 | −1.86 | −2.80 |

Zoom-lens unit data

| Unit | Starting surface | Focal distance | Lens structure length | Front principal point position | Rear principal point position |
|---|---|---|---|---|---|
| 1 | 1 | −2.02 | 0.64 | 0.05 | −0.37 |
| 2 | 5 | 1.50 | 0.53 | −0.17 | −0.48 |
| 3 | 11 | 4.41 | 0.14 | 0.00 | −0.07 |
| 4 | 14 | ∞ | 0.25 | 0.10 | −0.10 |

Single lens data

| Lens | Starting surface | Focal distance |
|---|---|---|
| 1 | 1 | −0.97 |
| 2 | 3 | 2.00 |
| 3 | 6 | 0.94 |
| 4 | 7 | −0.86 |
| 5 | 9 | 1.57 |
| 6 | 12 | 4.41 |
| 7 | 14 | ∞ |
| 8 | 16 | ∞ |

Numerical Example 2

Surface Data

| Surface No. | r | d | nd | vd | Effective diameter |
|---|---|---|---|---|---|
| 1* | 8.190 | 0.20 | 1.84862 | 40.0 | 1.63 |
| 2* | 0.746 | 0.18 | | | 1.26 |
| 3 | 1.098 | 0.27 | 1.84666 | 23.8 | 1.28 |
| 4 | 2.728 | (variable) | | | 1.21 |
| 5 | SP | −0.07 | | | 0.63 |
| 6* | 0.664 | 0.29 | 1.85960 | 40.4 | 0.63 |
| 7 | 2.791 | 0.08 | 1.80809 | 22.8 | 0.55 |
| 8 | 0.559 | 0.09 | | | 0.50 |
| 9 | 2.102 | 0.16 | 1.77250 | 49.6 | 0.51 |
| 10 | −2.992 | (variable) | | | 0.56 |
| 11 | SSP | −0.05 | | | 1.43 |
| 12 | 4.302 | 0.19 | 1.60311 | 60.6 | 1.44 |
| 13 | −6.918 | (variable) | | | 1.45 |
| 14 | ∞ | 0.05 | 1.51633 | 64.1 | 3.39 |
| 15 | ∞ | 0.12 | | | 3.39 |
| 16 | ∞ | 0.08 | 1.51633 | 64.1 | 3.39 |
| 17 | ∞ | | | | 3.39 |
| Image plane | ∞ | | | | |

Aspherical Surface Data

First surface

K = 1.92487e+001  A4 = −3.87040e−003  A6 = −1.59642e−002
A8 = 2.47284e−002  A10 = 3.15194e−004

Second surface

K = −2.24511e−001  A4 = −7.16473e−002  A6 = −9.87688e−002
A8 = −1.61198e−001  A10 = −1.72822e−002

Sixth surface

K = −9.95366e−001  A4 = 2.77490e−001  A6 = 2.63544e−001

Various data
Zoom ratio 2.86

| | Wide-angle | Middle | Telephoto |
|---|---|---|---|
| Focal distance | 1.00 | 1.92 | 2.86 |
| F-number | 3.28 | 4.63 | 5.97 |
| Angle of view | 33.3 | 18.9 | 13.9 |
| Image height | 3.88 | 3.88 | 4.17 |
| Lens total length | 4.85 | 4.52 | 4.94 |
| BF | 0.80 | 0.73 | 0.74 |
| d4 | 1.82 | 0.62 | 0.17 |
| d10 | 0.90 | 1.83 | 2.68 |
| d13 | 0.53 | 0.46 | 0.47 |
| Position of entrance pupil | 1.09 | 0.69 | 0.44 |
| Position of exit pupil | −2.62 | −5.19 | −10.76 |
| Front principal point position | 1.72 | 1.91 | 2.55 |
| Rear principal point position | −0.94 | −1.86 | −2.80 |

-continued

Zoom-lens unit data

| Unit | Starting surface | Focal distance | Lens structure length | Front principal point position | Rear principal point position |
|---|---|---|---|---|---|
| 1 | 1 | −2.06 | 0.66 | 0.04 | −0.39 |
| 2 | 5 | 1.54 | 0.55 | −0.18 | −0.50 |
| 3 | 11 | 4.43 | 0.14 | −0.01 | −0.08 |
| 4 | 14 | ∞ | 0.25 | 0.10 | −0.10 |

Single lens data

| Lens | Starting surface | Focal distance |
|---|---|---|
| 1 | 1 | −0.98 |
| 2 | 3 | 2.02 |
| 3 | 6 | 0.95 |
| 4 | 7 | −0.88 |
| 5 | 9 | 1.62 |
| 6 | 12 | 4.43 |
| 7 | 14 | ∞ |
| 8 | 16 | ∞ |

Numerical Example 3

Surface Data

| Surface No. | r | d | nd | vd | Effective diameter |
|---|---|---|---|---|---|
| 1* | 15.369 | 0.23 | 1.84862 | 40.0 | 1.78 |
| 2* | 0.782 | 0.19 | | | 1.37 |
| 3 | 1.197 | 0.31 | 1.84666 | 23.8 | 1.39 |
| 4 | 3.492 | (variable) | | | 1.32 |
| 5 | SP | −0.08 | | | 0.65 |
| 6* | 0.705 | 0.32 | 1.85960 | 40.4 | 0.65 |
| 7 | 3.493 | 0.09 | 1.80809 | 22.8 | 0.56 |
| 8 | 0.589 | 0.10 | | | 0.51 |
| 9 | 2.234 | 0.17 | 1.77250 | 49.6 | 0.53 |
| 10 | −3.180 | (variable) | | | 0.59 |
| 11 | SSP | −0.06 | | | 1.55 |
| 12 | 5.051 | 0.23 | 1.60311 | 60.6 | 1.55 |
| 13 | −4.879 | (variable) | | | 1.57 |
| 14 | ∞ | 0.05 | 1.51633 | 64.1 | 3.60 |
| 15 | ∞ | 0.13 | | | 3.60 |
| 16 | ∞ | 0.09 | 1.51633 | 64.1 | 3.60 |
| 17 | ∞ | | | | 3.60 |
| Image plane | ∞ | | | | |

Aspherical Surface Data

First surface

K = −2.38026e+001  A4 = 4.23524e−003  A6 = −1.59233e−002
A8 = 1.41837e−002  A10 = 1.28356e−003

Second surface

K = −2.54882e−001  A4 = −7.05539e−002  A6 = −1.04761e−001
A8 = −8.09827e−002  A10 = −7.24253e−002

Sixth surface

K = −9.94024e−001  A4 = 2.26043e−001  A6 = 1.79155e−001

Various data
Zoom ratio 2.86

| | Wide-angle | Middle | Telephoto |
|---|---|---|---|
| Focal distance | 1.00 | 1.92 | 2.86 |
| F-number | 3.28 | 4.65 | 5.98 |
| Angle of view | 35.0 | 20.0 | 14.7 |
| Image height | 3.88 | 3.88 | 4.17 |

-continued

| Lens total length | 5.15 | 4.85 | 5.28 |
|---|---|---|---|
| BF | 0.86 | 0.74 | 0.79 |
| d4 | 1.92 | 0.70 | 0.22 |
| d10 | 0.87 | 1.91 | 2.78 |
| d13 | 0.57 | 0.45 | 0.50 |
| Position of entrance pupil | 1.12 | 0.74 | 0.49 |
| Position of exit pupil | −2.79 | −6.20 | −15.31 |
| Front principal point position | 1.77 | 2.07 | 2.82 |
| Rear principal point position | −0.93 | −1.85 | −2.80 |

Zoom-lens unit data

| Unit | Starting surface | Focal distance | Lens structure length | Front principal point position | Rear principal point position |
|---|---|---|---|---|---|
| 1 | 1 | −2.10 | 0.73 | 0.02 | −0.46 |
| 2 | 5 | 1.63 | 0.60 | −0.20 | −0.55 |
| 3 | 11 | 4.15 | 0.17 | 0.02 | −0.07 |
| 4 | 14 | ∞ | 0.27 | 0.11 | −0.11 |

Single lens data

| Lens | Starting surface | Focal distance |
|---|---|---|
| 1 | 1 | −0.98 |
| 2 | 3 | 2.03 |
| 3 | 6 | 0.98 |
| 4 | 7 | −0.89 |
| 5 | 9 | 1.72 |
| 6 | 12 | 4.15 |
| 7 | 14 | ∞ |
| 8 | 16 | ∞ |

Numerical Example 4

Surface Data

| Surface No. | r | d | nd | vd | Effective diameter |
|---|---|---|---|---|---|
| 1* | 17.381 | 0.26 | 1.84862 | 40.0 | 2.04 |
| 2* | 0.831 | 0.22 | | | 1.52 |
| 3 | 1.263 | 0.32 | 1.80809 | 22.8 | 1.54 |
| 4 | 3.575 | (variable) | | | 1.47 |
| 5 | SP | −0.08 | | | 0.69 |
| 6* | 0.771 | 0.37 | 1.85960 | 40.4 | 0.69 |
| 7 | 5.852 | 0.10 | 1.80809 | 22.8 | 0.58 |
| 8 | 0.643 | 0.10 | | | 0.53 |
| 9 | 2.441 | 0.18 | 1.79304 | 47.3 | 0.55 |
| 10 | −3.416 | (variable) | | | 0.61 |
| 11 | SSP | −0.06 | | | 1.65 |
| 12 | 5.494 | 0.24 | 1.60311 | 60.6 | 1.65 |
| 13 | −5.079 | (variable) | | | 1.67 |
| 14 | ∞ | 0.06 | 1.51633 | 64.1 | 3.87 |
| 15 | ∞ | 0.14 | | | 3.87 |
| 16 | ∞ | 0.10 | 1.51633 | 64.1 | 3.87 |
| 17 | ∞ | | | | 3.87 |
| Image plane | ∞ | | | | |

Aspherical Surface Data

First surface

K = 1.76789e+002  A4 = 1.39335e−002  A6 = −1.93593e−002
A8 = 9.32657e−003  A10 = −1.98726e−003

Second surface

K = −2.96041e−001  A4 = −2.81702e−002  A6 = −6.99281e−002
A8 = 9.31356e−003  A10 = −1.21903e−001

Sixth surface

K = −9.86629e−001  A4 = 1.65104e−001  A6 = 1.02791e−001

-continued

Various data
Zoom ratio 2.86

|  | Wide-angle | Middle | Telephoto |
|---|---|---|---|
| Focal distance | 1.00 | 1.93 | 2.86 |
| F-number | 3.28 | 4.62 | 5.95 |
| Angle of view | 36.9 | 21.2 | 15.8 |
| Image height | 3.88 | 3.88 | 4.17 |
| Lens total length | 5.60 | 5.20 | 5.70 |
| BF | 0.90 | 0.92 | 0.94 |
| d4 | 2.14 | 0.76 | 0.29 |
| d10 | 0.91 | 1.86 | 2.82 |
| d13 | 0.59 | 0.62 | 0.63 |
| Position of entrance pupil | 1.19 | 0.80 | 0.57 |
| Position of exit pupil | −2.95 | −5.94 | −14.13 |
| Front principal point position | 1.86 | 2.11 | 2.85 |
| Rear principal point position | −0.94 | −1.87 | −2.79 |

Zoom-lens unit data

| Unit | Starting surface | Focal distance | Lens structure length | Front principal point position | Rear principal point position |
|---|---|---|---|---|---|
| 1 | 1 | −2.11 | 0.80 | 0.04 | −0.51 |
| 2 | 5 | 1.72 | 0.67 | −0.21 | −0.59 |
| 3 | 11 | 4.41 | 0.18 | 0.02 | −0.07 |
| 4 | 14 | ∞ | 0.29 | 0.12 | −0.12 |

Single lens data

| Lens | Starting surface | Focal distance |
|---|---|---|
| 1 | 1 | −1.04 |
| 2 | 3 | 2.27 |
| 3 | 6 | 1.00 |
| 4 | 7 | −0.90 |
| 5 | 9 | 1.82 |
| 6 | 12 | 4.41 |
| 7 | 14 | ∞ |
| 8 | 16 | ∞ |

Numerical Example 5

Surface Data

| Surface No. | r | d | nd | vd | Effective diameter |
|---|---|---|---|---|---|
| 1* | 8.588 | 0.26 | 1.84862 | 40.0 | 2.46 |
| 2* | 0.993 | 0.30 |  |  | 1.82 |
| 3 | 1.453 | 0.28 | 1.92286 | 20.9 | 1.83 |
| 4 | 2.530 | (variable) |  |  | 1.76 |
| 5 | SP | −0.11 |  |  | 0.85 |
| 6* | 0.792 | 0.36 | 1.85960 | 40.4 | 0.86 |
| 7 | 2.605 | 0.10 | 1.80809 | 22.8 | 0.75 |
| 8 | 0.661 | 0.09 |  |  | 0.68 |
| 9 | 2.155 | 0.18 | 1.67790 | 55.3 | 0.69 |
| 10 | −3.369 | (variable) |  |  | 0.69 |
| 11 | SSP | −0.06 |  |  | 1.70 |
| 12 | 5.698 | 0.22 | 1.60311 | 60.6 | 1.70 |
| 13 | −7.130 | (variable) |  |  | 1.71 |
| 14 | ∞ | 0.06 | 1.51633 | 64.1 | 1.94 |
| 15 | ∞ | 0.14 |  |  | 1.94 |
| 16 | ∞ | 0.10 | 1.51633 | 64.1 | 1.94 |
| 17 | ∞ |  |  |  | 1.94 |
| Image plane | ∞ |  |  |  |  |

-continued

Aspherical Surface Data

First surface

| K = 3.61494e+001 | A4 = 4.81234e−003 | A6 = −1.41923e−002 |
|---|---|---|
| A8 = 9.85721e−003 | A10 = −3.40897e−003 |  |

Second surface

| K = −3.02155e−001 | A4 = 7.69643e−004 | A6 = −1.80808e−002 |
|---|---|---|
| A8 = 9.15159e−003 | A10 = −1.29113e−002 |  |

Sixth surface

| K = −1.00082e+000 | A4 = 1.63012e−001 | A6 = 1.39060e−001 |
|---|---|---|

Various data
Zoom ratio 3.92

|  | | | |
|---|---|---|---|
| Focal distance | 1.00 | 2.43 | 3.92 |
| F-number | 2.81 | 4.34 | 5.98 |
| Angle of view | 36.9 | 17.2 | 11.7 |
| Image height | 3.68 | 3.88 | 3.88 |
| Lens total length | 6.35 | 5.65 | 6.50 |
| BF | 0.99 | 0.95 | 0.84 |
| d4 | 2.83 | 0.74 | 0.20 |
| d10 | 0.90 | 2.34 | 3.85 |
| d13 | 0.68 | 0.64 | 0.53 |
| Position of entrance pupil | 1.46 | 0.85 | 0.56 |
| Position of exit pupil | −2.82 | −6.89 | −23.98 |
| Front principal point position | 2.12 | 2.44 | 3.84 |
| Rear principal point position | −0.93 | −2.36 | −3.85 |

Zoom-lens unit data

| Unit | Starting surface | Focal distance | Lens structure length | Front principal point position | Rear principal point position |
|---|---|---|---|---|---|
| 1 | 1 | −2.40 | 0.84 | 0.09 | −0.49 |
| 2 | 5 | 1.87 | 0.62 | −0.27 | −0.61 |
| 3 | 11 | 5.29 | 0.16 | −0.00 | −0.08 |
| 4 | 14 | ∞ | 0.29 | 0.12 | −0.12 |

Single lens data

| Lens | Starting surface | Focal distance |
|---|---|---|
| 1 | 1 | −1.34 |
| 2 | 3 | 3.28 |
| 3 | 6 | 1.21 |
| 4 | 7 | −1.12 |
| 5 | 9 | 1.97 |
| 6 | 12 | 5.29 |
| 7 | 14 | ∞ |
| 8 | 16 | ∞ |

TABLE 1

|  | Example 1 | Example 2 | Example 3 | Example 4 | Example 5 |
|---|---|---|---|---|---|
| (1) | −4.85 | −4.77 | −5.13 | −5.50 | −5.32 |
| (2) | 1.52 | 1.59 | 2.02 | 2.04 | 1.84 |
| (3) | 0.04 | 0.02 | −0.25 | −0.12 | −0.11 |
| (4) | −0.48 | −0.51 | −0.46 | −0.46 | −0.45 |
| (5) | 1.72 | 1.63 | 1.54 | 1.50 | 1.87 |
| (6) | −0.38 | −0.35 | −0.32 | −0.32 | −0.35 |

An exemplary embodiment of a digital still camera (image pickup apparatus)/(optical apparatus) that uses a zoom lens according to an exemplary embodiment of the present invention as a photographic optical system will be described below with reference to FIG. 11.

Referring to FIG. 11, the digital still camera includes a camera body 20, a photographic optical system 21 that includes a zoom lens according to an exemplary embodiment of the present invention. The digital still camera also includes a solid-state image sensor (photoelectrical conversion element) 22, such as a CCD sensor or a CMOS sensor, that receives an object image formed by the photographic optical system 21. The digital still camera further includes a memory 23 configured to record information corresponding to an object image photoelectrically converted by the solid-state image sensor 22. The digital still camera further includes a viewfinder 24 that includes a liquid crystal display panel configured to allow a user to observe an object image formed on the solid-state image sensor 22.

The barrel-type distortion aberration which can be easily generated on the wide angle side is corrected by extending an image by image processing. For attaining such correction, it is preferred to make small an effective image circle diameter (diameter of an image circle) at the wide angle end compared with an effective image circle diameter at the telephoto end.

As described above, the zoom lens according to an exemplary embodiment of the present invention can be applied to an image pickup apparatus, such as a digital still camera, to implement a small-sized image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-272918 filed Oct. 23, 2008, which is hereby incorporated by reference herein in its entirety.

What is claimed is:

1. A zoom lens comprising:
a first lens unit with a negative refractive power;
a second lens unit with a positive refractive power;
and a third lens unit with a positive refractive power, which are arranged in order from the object side to the image side, wherein
the first lens unit includes a negative lens and a positive lens, and
when the curvature radius of the object side surface of the negative lens and the curvature radius of the image side surface of the negative lens are respectively defined as R11 and R12 and the curvature radius of the object side surface of the positive lens and the curvature radius of the image side surface of the positive lens are respectively defined as R21 and R22, R11, R12, R21, and R22, f1 denotes a focal length of the first lens unit and f3 denotes a focal length of the third lens unit, the following conditional expressions are satisfied:

$$-5.6<(R12+R21)/(R12-R21)<-4.7$$
$$1.5<(R11+R22)/(R11-R22)<2.3 \text{ and}$$
$$-0.6<f1/f3<-0.3.$$

2. The zoom lens according to claim 1, wherein
the third lens unit includes a positive lens, and
when the curvature radius of the object side surface of the positive lens in the third lens unit is defined as R31 and that of the image side surface of the positive lens in the third lens unit is defined as R32, R31 and R32 satisfy the following conditional expression:

$$-0.4<(R31+R32)/(R31-R32)<0.2.$$

3. The zoom lens according to claim 1, wherein
when f1 denotes a focal length of the first lens unit and f3 denotes a focal length of the third lens unit, the following conditional expression is satisfied:

$$-0.55<f1/f3<-0.3.$$

4. The zoom lens according to claim 1, wherein
when fw denotes a focal length of the entire system at the wide angle end and f2 denotes a focal length of the second lens unit, the following conditional expression is satisfied:

$$1.4<f2/fw<2.0.$$

5. The zoom lens according to claim 1, wherein
when D1 denotes a distance between the surface vertex of the first lens unit located closest to the object side and the surface vertex of the first lens unit located closest to the image side on the optical axis and f1 denotes a focal length of the first lens unit, the following conditional expression is satisfied:

$$-0.45<D1/f1<-0.25.$$

6. The zoom lens according to claim 1, wherein
the whole or part of the second lens unit is moved so that the movement of the second lens unit has a component perpendicular to an optical axis to displace an object image in a direction perpendicular to the optical axis.

7. An optical apparatus comprising:
a zoom lens as described in claim 1; and
an image pickup element that receives light of an image formed by the zoom lens.

8. The optical apparatus according to claim 7, wherein
an effective image circle diameter at the wide angle end is smaller than an effective image circle diameter at the telephoto end.

* * * * *